(12) United States Patent
Sato

(10) Patent No.: US 8,287,377 B2
(45) Date of Patent: Oct. 16, 2012

(54) MOVEMENT DIRECTION CALCULATOR AND METHOD FOR CALCULATING MOVEMENT DIRECTION

(75) Inventor: Kenta Sato, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 8 days.

(21) Appl. No.: 12/958,003

(22) Filed: Dec. 1, 2010

(65) Prior Publication Data

US 2011/0294578 A1     Dec. 1, 2011

Related U.S. Application Data

(62) Division of application No. 11/520,813, filed on Sep. 14, 2006, now Pat. No. 7,988,558.

(30) Foreign Application Priority Data

| Apr. 27, 2006 | (JP) | ................................. 2006-124286 |
| Apr. 27, 2006 | (JP) | ................................. 2006-124287 |
| Apr. 27, 2006 | (JP) | ................................. 2006-124288 |
| Apr. 27, 2006 | (JP) | ................................. 2006-124289 |

(51) Int. Cl.
*A63F 9/24*     (2006.01)

(52) U.S. Cl. ....................................................... 463/37

(58) Field of Classification Search .................... 463/36, 463/37
See application file for complete search history.

(56) References Cited

U.S. PATENT DOCUMENTS

| 3,689,741 | A | * | 9/1972 | Sjoberg et al. ................. 235/402 |
| 5,902,968 | A | | 5/1999 | Sato et al. |
| 5,981,884 | A | | 11/1999 | Sato et al. |
| 6,045,446 | A | * | 4/2000 | Ohshima ........................... 463/2 |
| 6,084,577 | A | | 7/2000 | Sato et al. |
| 6,229,102 | B1 | | 5/2001 | Sato et al. |
| 6,590,536 | B1 | | 7/2003 | Walton |
| 6,744,420 | B2 | | 6/2004 | Mohri |
| 7,335,105 | B2 | * | 2/2008 | Ueshima ........................ 463/36 |
| 7,596,466 | B2 | * | 9/2009 | Ohta ............................. 702/152 |
| 2001/0029783 | A1 | | 10/2001 | Uchiyama et al. |

(Continued)

FOREIGN PATENT DOCUMENTS

JP     4-237319     8/1992

(Continued)

OTHER PUBLICATIONS

Office Action issued Jul. 1, 2008 in corresponding Japanese Application No. 2006-124286.

(Continued)

*Primary Examiner* — Corbett B Coburn
(74) *Attorney, Agent, or Firm* — Nixon & Vanderhye P.C.

(57) ABSTRACT

A movement direction calculating apparatus including a processor executing instructions for: obtaining acceleration data output from the multi-axis acceleration sensor during each of successive intervals; determining a movement period as a period during a movement of the input device wherein the determination is based on the obtained acceleration data; calculating a plurality of difference vectors each representing a difference between a pair of acceleration vectors corresponding to acceleration data, wherein each of the acceleration vectors is a vector whose components are acceleration values with respect to a plurality of axes of acceleration values corresponding to axes indicated by the acceleration data; summing the difference vectors to calculate a direction vector, wherein each of the difference vectors is assigned a weight depending on a magnitude of the difference vector, and designating as the movement direction a direction indicated by the direction vector.

18 Claims, 20 Drawing Sheets

U.S. PATENT DOCUMENTS

2002/0072418 A1 6/2002 Masuyama et al.
2005/0071063 A1 3/2005 Yamashita

FOREIGN PATENT DOCUMENTS

| JP | 06-190144 | 7/1994 |
| JP | 9-230997 | 9/1997 |
| JP | 10-21000 | 1/1998 |
| JP | 2000-308756 | 11/2000 |
| JP | 2001-159951 | 6/2001 |
| JP | 2001-241975 | 9/2001 |
| JP | 2002-153673 | 5/2002 |
| JP | 2005-106664 | 4/2005 |
| JP | 2005-000471 | 6/2005 |
| JP | 2006-047295 | 2/2006 |

OTHER PUBLICATIONS

Office Action issued Jun. 27, 2008 in corresponding Japanese Application No. 2006-124287.
Yoshizawa, Sumio, "1.4gemu de chikara to undo no kankei o kangaeyo (Force. vbp), Visual Basic & Delphi de buturi ga wakaru rikigaku shimyureshon," CQ Publishing Co., Ltd. Feb. 20, 1998, First edition, p. 33-35 w/ an at least partial Enlish-language translation.
EP 06018670.7, EPO Search Report (Dec. 23, 2011).

* cited by examiner

MOVEMENT DIRECTION CALCULATOR AND METHOD FOR CALCULATING MOVEMENT DIRECTION

CROSS RELATED APPLICATION

This application is a divisional of application Ser. No. 11/520,813 filed Sep. 14, 2006 (now U.S. Pat. No. 7,988, 558), and claims priority to Japanese Patent Application Nos. 2006-124286, 2006-124287, 2006-124288, and 2006-124289, all filed on Apr. 27, 2006 which applications are incorporated in their entirety by reference herein.

BACKGROUND OF THE INVENTION

1. Field of the Invention

The present invention relates to a game apparatus, and a storage medium storing a game program. More particularly, the present invention relates to a game apparatus which executes a game process in which acceleration data output from an acceleration sensor provided in an input device is used, and a storage medium storing a game program.

2. Description of the Background Art

Patent Document 1 (Japanese Patent Laid-Open Publication No. 2000-308756) describes an input control device comprising a multi-axis acceleration sensor and a multi-axis gyro-sensor. The input control device has a bar-shaped main body, and detects an acceleration of the main body using the acceleration sensor, and a tilt or a twist of the main body using the gyro-sensor. The input control device of Patent Document 1 employs the acceleration sensor so as to detect a movement of an input device which is operated by a player's hand, and the gyro-sensor so as to sense a rotation (attitude) of the input device. Thus, conventionally, a plurality of sensors is used to detect a plurality of states (e.g., a position, an attitude, a movement, etc.) of an input device and cause the states to be reflected on a game process.

In the technique of Patent Document 1, two kinds of sensors (i.e., the acceleration sensor and the gyro-sensor) need to be used so as to detect a plurality of states of an input device. When two kinds of sensors are thus provided in an input device, the size and manufacturing cost of the input device are increased. On the other hand, if only an acceleration sensor is provided in an input device, the device can detect only one kind of state, so that only a simple operation can be accepted using the input device. Therefore, even when the input device is used with respect to a game apparatus, a player can perform only a simple game operation, so that a game itself is simple and uninteresting.

Patent Document 2 (Japanese Patent Laid-Open Publication No. 2001-159951) describes a technique of calculating a tilt of a device using an acceleration sensor. In this device, the acceleration sensor detects a force applied to the device to generate an acceleration value. An angle detecting means calculates an angle (tilt) of the device based on the acceleration value to generate an angle value. Also in the device, characteristic information for estimating a status of use of the device, depending on a change in the force applied to the device, is held, and based on the characteristic information, a process of extracting a component relating to a user's tilt operation from the angle value is performed, thereby obtaining information about the tilt operation. Note that the characteristic information refers to information indicating a pattern of change in acceleration when the device is on a train. An operation command is generated based on the tilt operation information thus obtained. Therefore, even when a force is applied to the device due to a factor other than user's operations, the device can extract only a component which matches a user's operation. For example, although a component due to a movement of a train is detected when the device is on the train, a user's operation is accurately determined without an influence of the component.

The device of Patent Document 2 can determine a user's operation by using an acceleration value obtained from the acceleration sensor. However, the case where a force exceeding a limit of detection by the acceleration sensor is applied to the acceleration sensor (e.g., a user strongly swing the device, etc.), is not taken into consideration. Therefore, in this case, the acceleration value obtained from the acceleration sensor does not indicate a correct value, so that it is not possible to accurately determine a user's operation.

The device of Patent Document 2 can also calculate a direction of gravity by eliminating noise which is a factor other than user's operations. However, when a user performs an operation other than a tilt operation, an influence of the operation other than the tilt operation cannot be eliminated, so that the gravity direction cannot be accurately calculated. For example, when a user strongly swings the device, a great force other than gravity is applied to the acceleration detecting means, and the device cannot eliminate an influence of the force. Therefore, in such a case, the device cannot accurately calculate the gravity direction, so that a tilt of the device cannot be calculated.

Patent Document 3 (Japanese Patent Laid-Open Publication No. 2002-153673) describes a technique of detecting a motion of a controller which mimics a glove for covering a hand. The controller comprises an acceleration sensor, and detects acceleration values in three axial directions using the acceleration sensor. Based on a pattern of waveforms of the detected acceleration values, a motion (i.e., a type of punch) of the controller is determined.

The controller of Patent Document 3 can only divide punches into only several types based on the waveform pattern, and cannot determine a movement direction of the controller in detail. Therefore, operations which can be input by a player are limited to several types, so that the contents of a game are simple, likely resulting in an uninteresting game.

SUMMARY OF THE INVENTION

Specifically, a first embodiment of the present invention is a game apparatus and a game program which can provide a complicated operation with a simple structure. The game apparatus and a game program of the first embodiment may be used to correct an acceleration value obtained from an acceleration sensor to a more accurate value. The first embodiment may be used to provide a gravity direction calculating apparatus and a gravity direction calculating program which can accurately calculate a gravity direction even when an input device is moving. The first embodiment may be used to provide a movement direction calculating apparatus and a movement direction calculating program which can accurately calculate a movement direction of the input device.

Note that reference numerals, additional descriptions and the like inside parentheses in this section indicate correspondence to embodiments described below for the sake of easy understanding, and do not restrict the present invention.

A first aspect of the first embodiment is directed to a game apparatus (3) for executing a game process using acceleration data (621) output from a multi-axis acceleration sensor (3) included in an input device (7). The game apparatus comprises an obtaining means (CPU 10, etc. for executing step S2; hereinafter only step numbers are described in parentheses in a similar case), a gravity direction calculating means (S25), a first movement direction calculating means (S23, S24), and a game processing means (S9). The obtaining means successively obtains the acceleration data. The gravity direction calculating means calculates a gravity direction which is represented using an orientation of the input device as a reference, based on values of a plurality of pieces of acceleration data (selected acceleration data group 631) obtained during a predetermined period. The first movement direction calculating means calculates a first movement direction which is a movement direction of the input device which is represented using the orientation of the input device as the reference, based on the values of the plurality of pieces of acceleration data obtained during the predetermined period. The game processing means executes a game process based on the first movement direction and the gravity direction.

In a second aspect, the game apparatus may further comprise a second movement direction calculating means (S26). The second movement direction calculating means calculates a second movement direction (swing direction) which is a movement direction of the input device with respect to the gravity direction, based on the first movement direction and the gravity direction. In this case, the game processing means executes a game process based on the second movement direction.

In a third aspect, the second movement direction calculating means may calculate, as the second movement direction, a direction of a movement direction vector (Vm) indicating the first movement direction in a coordinate system for indicating values of the acceleration data when the movement direction vector, and a gravity direction vector indicating the gravity direction in the coordinate system are rotated so that the gravity direction vector is oriented in a predetermined reference direction.

In a fourth aspect, the game processing means may execute a game process for moving an object displayed on a display device in a direction corresponding to the second movement direction.

In a fifth aspect, the game apparatus may further comprise a period detecting means (S4, S7). The period detecting means detects a period from start to end of movement of the input device, as the predetermined period (movement period), based on the acceleration data obtained by the obtaining means.

In a sixth aspect, the period detecting means may include a start setting means (S4) and an end setting means (S7). The start setting means sets a time point when an acceleration value with respect to one predetermined axis of acceleration values with respect to axes indicated by the acceleration data obtained by the obtaining means, exceeds a first threshold, to be a start time point of the predetermined period. The end setting means sets a time point when the acceleration value with respect to the one predetermined axis of the acceleration values with respect to the axes indicated by the acceleration data obtained by the obtaining means, becomes smaller than a second threshold, to be an end time point of the predetermined period.

In a seventh aspect, the gravity direction calculating means may calculate the gravity direction from a deviation of an acceleration data group obtained during a predetermined period when an origin of a coordinate system for representing the values of the acceleration data is used as a reference.

In an eighth aspect, the gravity direction calculating means may calculate a sum of acceleration vectors corresponding to the acceleration data obtained during the predetermined period, and a direction determined by a vector indicated by the sum may be the gravity direction, where the acceleration vector is a vector whose components are acceleration values with respect to a plurality of axes of acceleration values with respect to axes indicated by the acceleration data.

In a ninth aspect, the first movement direction calculating means may calculate the first movement direction from transition of values of an acceleration data group obtained during the predetermined period.

In a tenth aspect, the first movement direction calculating may means comprise a difference vector calculating means (S23) and a calculation executing means (S24). The difference vector calculating means calculates a difference vector between an acceleration vector corresponding to acceleration data and an acceleration vector corresponding to acceleration data obtained next to the acceleration data, for each piece of acceleration data obtained during the predetermined period, wherein the acceleration vector is a vector whose components are acceleration values with respect to a plurality of axes of acceleration values with respect to axes indicated by the acceleration data. The calculation executing means calculates the first movement direction based on the difference vectors calculated with respect to the acceleration data obtained during the predetermined period.

In an eleventh aspect, the calculation executing means may calculate a sum of the difference vectors calculated for the acceleration data obtained during the predetermined period while assigning each difference vector a weight depending on the magnitude of the difference vector, and a direction of a vector indicated by the sum may be the first movement direction.

In a twelfth aspect, the game apparatus may further comprise a selecting means (S21) and a correcting means (S22). The selecting means selects one or more pieces of limit acceleration data indicating a limit value of a detectable range of the acceleration sensor, from the acceleration data obtained during the predetermined period. The correcting means corrects the limit acceleration data so that a value of at least one piece of limit acceleration data is a value outside the range, based on non-limit acceleration data indicating a value which is not the limit value, of the acceleration data group. In this case, the gravity direction calculating means calculates a gravity direction based on the acceleration data including the limit acceleration data corrected by the correcting means. The first movement direction calculating means calculates a first movement direction based on the acceleration data including the limit acceleration data corrected by the correcting means.

A thirteenth aspect is directed to a gravity direction calculating apparatus (game apparatus 3) for calculating a direction of gravity with respect to an input device (controller 7). The gravity direction calculating apparatus comprises an obtaining means (CPU 10, etc. for executing step S2; hereinafter only step numbers are described in parentheses in a similar case), a period detecting means (S4, S7), and a gravity direction calculating means (S25). The obtaining means successively obtains acceleration data (621) output from a multi-axis acceleration sensor (37) included in the input device. The period detecting means detects a period from start to end of movement of the input device, as a movement period, based on the obtained acceleration data. The gravity direction calculating means calculates a sum of one or more acceleration vectors corresponding to one or more pieces of acceleration data (selected acceleration data group 631) obtained during the movement period, a direction determined by a vector indicated by the sum being the gravity direction, wherein the acceleration vector is a vector whose components are acceleration values with respect to a plurality of axes of acceleration values with respect to axes indicated by the acceleration data.

In a fourteenth aspect, the period detecting means includes a start setting means (S4) and an end setting means (S7). The start setting means sets a time point when an acceleration value with respect to one predetermined axis (z axis) of acceleration values with respect to axes indicated by the obtained acceleration data, exceeds a first threshold, to be a start time point of the movement period. The end setting means sets a time point when the acceleration value with respect to the one predetermined axis of the acceleration values with respect to the axes indicated by the obtained acceleration data, becomes smaller than a second threshold, to be an end time point of the movement period.

In a fifteenth aspect, the multi-axis acceleration sensor may be a three-axis acceleration sensor. In this case, the gravity direction calculating means uses, as the acceleration vector, a vector whose components are acceleration values with respect to two axes other than the one predetermined axis, of the acceleration values with respect to the axes indicated by the acceleration data.

In a sixteenth aspect, the gravity direction calculating apparatus may further comprise a difference vector calculating means (S23), a movement direction calculating means (S24), and a game processing means (S9). The difference vector calculating means calculates a difference vector between an acceleration vector corresponding to acceleration data and an acceleration vector corresponding to acceleration data obtained next to the acceleration data, for each piece of acceleration data obtained during the movement period. The movement direction calculating means calculates a sum of the difference vectors calculated for the acceleration data obtained during the predetermined period while assigning each difference vector a weight depending on the magnitude of the difference vector, and a direction of a vector indicated by the sum is the first movement direction. The game processing means executes a predetermined game process based on the movement direction and the gravity direction.

A seventeenth aspect is directed to a movement direction calculating apparatus (game apparatus 3) for calculating a movement direction of an input device (controller 7) comprises an obtaining means (CPU 10, etc. for executing step S2; hereinafter only step numbers are described in parentheses in a similar case), a period detecting means (S4, S7), a difference vector calculating means (S23), and a movement direction calculating means (S24). The obtaining means successively obtains acceleration data (621) output from a multi-axis acceleration sensor included in the input device. The period detecting means detects a period from start to end of movement of the input device, as a movement period, based on the obtained acceleration data. The difference vector calculating means calculates a difference vector between an acceleration vector corresponding to acceleration data and an acceleration vector corresponding to acceleration data obtained next to the acceleration data, for each piece of acceleration data (selected acceleration data group 631) obtained during the movement period, wherein the acceleration vector is a vector whose components are acceleration values with respect to a plurality of axes of acceleration values with respect to axes indicated by the acceleration data. The movement direction calculating means calculates a sum of the difference vectors calculated for the acceleration data obtained during the movement period while assigning each difference vector a weight depending on the magnitude of the difference vector, wherein a direction of a vector indicated by the sum is the movement direction.

In an eighteenth aspect, the period detecting means includes a start setting means (S4) and an end setting means (S7). The start setting means sets a time point when an acceleration value with respect to one predetermined axis (z axis) of acceleration values with respect to axes indicated by the obtained acceleration data, exceeds a first threshold, to be a start time point of the movement period. The end setting means sets a time point when the acceleration value with respect to the one predetermined axis of the acceleration values with respect to the axes indicated by the obtained acceleration data, becomes smaller than a second threshold, to be an end time point of the movement period.

In a nineteenth aspect, the multi-axis acceleration sensor may be a three-axis acceleration sensor. In this case, the gravity direction calculating means may use, as the acceleration vector, a vector whose components are acceleration values with respect to two axes other than the one predetermined axis, of the acceleration values with respect to the axes indicated by the acceleration data.

In a twentieth aspect, the movement direction calculating apparatus may further comprise a gravity direction calculating means (S25) and a game processing means (S9). The gravity direction calculating means calculates a sum of acceleration vectors corresponding to a plurality of pieces of acceleration data obtained during the movement period, as a gravity direction applied to the input device. The game processing means executes a game process based on the movement direction and the gravity direction.

A second embodiment of the invention is a game apparatus for executing a game process (3) using acceleration data (621) output from an acceleration sensor (37) included in an input device (controller 7). The game apparatus comprises an obtaining means (CPU 10, etc. for executing steps S2 and S6; hereinafter only step numbers are described in parentheses in a similar case), a selecting means (S21), a correcting means (S22), and a game processing means (9). The obtaining means successively obtains and stores acceleration data (selected acceleration data group 631) output during a predetermined period into a memory (13). The selecting means selects one or more pieces of limit acceleration data (631') indicating a limit value of a detectable range of the acceleration sensor, from an acceleration data group stored in the memory. The correcting means corrects the limit acceleration data so that a value of at least one piece of limit acceleration data is a value outside the range, based on non-limit acceleration data indicating a value which is not the limit value, of the acceleration data group. The game processing means executes a game process based on the acceleration data group including the limit acceleration data corrected by the correcting means.

In a twenty-second aspect, the correcting means may include an extension line calculating means (S32 to S39) and a correction executing means (S40). The extension line calculating means calculates, based on the non-limit acceleration data, an extension line (L) passing through coordinate points of immediately previous acceleration data obtained immediately before the limit acceleration data, and immediately next acceleration data obtained immediately after the limit acceleration data, of the non-limit acceleration data, and through the outside of the range, in a coordinate system (xy coordinate system) for representing values of the acceleration data. The correction executing means corrects a value of the limit acceleration data so as to be a value positioned on the extension line.

In a twenty-third aspect, the extension line calculating means may include a first vector calculating means (S35), a second vector calculating means (S36), and a slope determining means (S38). The first vector calculating means calculates a first direction vector (V1) in the coordinate system based on the immediately previous acceleration data, and one or more pieces of non-limit acceleration data obtained before the immediately previous acceleration data. The second vector calculating means calculates a second direction vector (V2) in the coordinate system based on the immediately next acceleration data, and one or more pieces of non-limit acceleration data obtained after the immediately next acceleration data. The slope determining means determines a slope (vector V4) of the extension line at a coordinate position of the immediately previous acceleration data based on the first direction vector, and determines a slope (vector V5) of the extension line at a coordinate position of the immediately next acceleration data based on the second direction vector.

In a twenty-fourth aspect, the extension line calculating means may include a third vector calculating means (S32 to S35) and a slope determining means (S38). The third vector calculating means calculates a third direction vector (V3) in the coordinate system based on at least each piece of non-limit acceleration data of the acceleration data group. The slope determining means determines a slope (vectors V4 and V5) of the extension line at a coordinate position of each of the immediately previous acceleration data and the immediately next acceleration data based on the third direction vector.

In a twenty-fifth aspect, the extension line calculating means may include a first vector calculating means (S35), a second vector calculating means (S36), a third vector calculating means (S32 to S35), and a slope determining means (S38). The first vector calculating means calculates a first direction vector in the coordinate system based on the immediately previous acceleration data, and one or more pieces of non-limit acceleration data obtained before the immediately previous acceleration data. The second vector calculating means calculates a second direction vector in the coordinate system based on the immediately next acceleration data, and one or more pieces of non-limit acceleration data obtained after the immediately next acceleration data. The third vector calculating means calculates a third direction vector in the coordinate system based on at least each piece of non-limit acceleration data of the acceleration data group. The slope determining means determines a slope of the extension line at a coordinate position of the immediately previous acceleration data to be a direction of a vector calculated based on the first direction vector and the third direction vector, and determines a slope of the extension line at a coordinate position of the immediately next acceleration data to be a direction of a vector calculated based on the second direction vector and the third direction vector.

In a twenty-sixth aspect, the first vector calculating means may calculate, as the first direction vector, a vector indicating a slope of a straight line connecting a coordinate point of the immediately previous acceleration data, and a coordinate point of first preceding acceleration data obtained with respect to the immediately previous acceleration data. The second vector calculating means may calculate, as the second direction vector, a vector indicating a slope of a straight line connecting a coordinate point of the immediately next acceleration data, and a coordinate point of first succeeding acceleration data obtained with respect to the immediately next acceleration data.

In a twenty-seventh aspect, the third vector calculating means may calculate, for each piece of acceleration data included in the acceleration data group, a change amount between a value of acceleration data, and a value of acceleration data obtained immediately after the acceleration data, and calculates the third direction vector based on each calculated change amount.

In a twenty-eighth aspect, the extension line calculating means may determine a shape of an extension line for correcting the limit acceleration data so that a distance from a position (point B in FIG. 18) on the extension line most distant from the range (area A in FIG. 18) in the coordinate system to the range increases with an increase in the number (protrusion amount n) of successively obtained pieces of limit acceleration data.

In a twenty-ninth aspect, the extension line may be a curve represented by a function using one or more control points (first to fourth control points P0 to P3). In this case, the extension line calculating means determines a control point based on non-limit acceleration data.

In a thirtieth aspect, the acceleration sensor may output acceleration data indicating accelerations with respect to at least two axes. In this case, the coordinate system is a two-dimensional coordinate system (xy coordinate system of FIG. 15) whose axes represent accelerations of the two axes indicated by the acceleration data.

In a thirty-first aspect, the acceleration sensor may output acceleration data indicating an acceleration with respect to at least one axis. In this case, the coordinate system is a two-dimensional coordinate system (ts coordinate system of FIG. 23) whose axes represent an acceleration with respect to the one axis indicated by the acceleration data and a time.

Also, the present invention may be embodied as a non-transitory storage medium storing a game program (61) for causing a computer in a game apparatus to execute the above-described operation.

According to the first aspect, acceleration data is obtained from the input device, and from the obtained acceleration data, two kinds of information indicating states of the input device (i.e., a movement direction and a gravity direction) are calculated. Thus, the game apparatus can obtain two kinds of information indicating states of the input device from one kind of information detected by a sensor. The game apparatus performs a game process, reflecting the two kinds of information on a game operation. Thereby, according to the first aspect, the player is allowed to perform a complicated game operation based on the two kinds of states of the input device using a simple configuration in which only one sensor is employed.

According to the second aspect, the second movement direction which is a movement direction of the input device with respect to a gravity direction, thereby making it possible to calculate an absolute movement direction in real space irrespective of the attitude of the input device. Also, thereby, the player can perform a game operation while holding the input device in any arbitrary attitude thereof.

According to the third aspect, it is possible to easily calculate the second movement direction using the gravity direction vector and the movement direction vector.

According to the fourth aspect, an object on a screen can be moved in a direction corresponding to a direction in which the input device is moved. Therefore, by moving the input device in a desired direction, the player can have a sensation as if the player held and moved an object on a screen.

According to the fifth aspect, two kinds of information (i.e., a first movement direction and a gravity direction) indicating a state of the input device can be calculated while the input device is moved.

According to the sixth aspect, a start time and an end time of a period for which the input device is moved can be easily detected.

According to the seventh aspect, regarding an acceleration data group obtained during a predetermined period, a gravity direction is calculated from a deviation, where the origin of a coordinate system for representing values of acceleration data is used as a reference. The slope indicates a component which is invariably included in the acceleration data obtained during the predetermined period, i.e., a component caused by gravity applied to the input device. Therefore, by calculating the deviation, a gravity direction can be calculated.

According to the eighth aspect, a gravity direction is calculated by calculating a sum of acceleration vectors detected during a predetermined period. Here, since the acceleration vector detected during the predetermined period includes a component caused by gravity applied to the input device and a component caused by movement of the input device, the gravity direction cannot be accurately recognized directly from the detected acceleration during the predetermined period. In contrast to this, according to the eighth aspect, since the sum of acceleration vectors detected during the predetermined period is calculated, the components of the acceleration vectors caused by movement of the input device cancel each other, only the component caused by gravity can be extracted. Therefore, the gravity direction can be accurately calculated even when the input device is moved.

According to the ninth aspect, the first movement direction is calculated from transition of values of a acceleration data group obtained during a predetermined period. The transition of the values of the acceleration data indicates a component caused by movement of the input device, of the components included in the acceleration data. Therefore, the first movement direction can be calculated by calculating the transition.

According to the tenth aspect, a difference vector is calculated for each piece of acceleration data obtained in a predetermined period. Since the difference vector indicates transition of acceleration values during the predetermined period, the first movement direction can be easily calculated based on the difference vectors.

According to the eleventh aspect, the first movement direction can be calculated by calculating a sum of difference vectors while assigning weights thereto. Here, in a method of calculating a sum of difference vectors without assigning weights thereto, the first movement direction may not be accurately recognized, depending on the result of detection during the predetermined period. For example, when a value of acceleration data first obtained during the predetermined period and a value of acceleration data last obtained during the predetermined period have substantially the same value, the sum of the difference vectors is "0", so that the first movement direction cannot be accurately recognized. In contrast to this, according to the eleventh aspect, a sum is calculated, taking the above-described weight into consideration. Therefore, even if the two pieces of acceleration data obtained first and last during the predetermined period have the same value, a vector indicating the sum is not "0". According to the eleventh aspect, a component of one having a large magnitude of the difference vectors is represented by the sum, thereby making it possible to accurately calculate the first movement direction.

According to the twelfth aspect, limit acceleration data is selected from an acceleration data group by the selecting means, and a value of at least one piece of limit acceleration data is corrected by the correcting means so that the value is outside a detectable range of the acceleration sensor. By the correction, the game apparatus can correct a value of an acceleration obtained from the acceleration sensor into a value more approximate to an actual value. In other words, the value of an acceleration obtained from the acceleration sensor can be corrected into a more accurate value. Therefore, a gravity direction and a first movement direction can be more accurately calculated using the corrected acceleration data.

According to the thirteenth aspect, a gravity direction can be calculated by calculating a sum of acceleration vectors detected during a movement period. Here, since the acceleration vector detected during the movement period includes a component caused by gravity applied to the input device and a component caused by movement of the input device, the gravity direction cannot be accurately recognized directly from the detected acceleration during the movement period. In contrast to this, according to the thirteenth aspect, since the sum of acceleration vectors detected during the movement period is calculated, the components of the acceleration vectors caused by movement of the input device cancel each other, only the component caused by gravity can be extracted. Therefore, the gravity direction can be accurately calculated even when the input device is moved.

According to the fourteenth aspect, it is possible to easily detect a start time and an end time of a period during which the input device is moved.

According to the fifteenth aspect, the movement period can be easily detected using an acceleration value with respect one predetermined axis of a three-axis acceleration sensor. Also, acceleration values with respect to two axes other than the one predetermined axis can be used to easily calculate a gravity direction with respect to directions of the two axes.

According to the sixteenth aspect, a movement direction of the input device as well as a gravity direction are calculated. From acceleration data obtained from the input device, two kinds of information indicating states of the input device (i.e., a gravity direction and a movement direction) are calculated. The game apparatus performs a game process, reflecting the two kinds of information on a game operation. Thereby, according to the sixteenth aspect, the player is allowed to perform a complicated game operation based on the two kinds of states of the input device using a simple configuration in which only one sensor is employed.

According to the seventeenth aspect, a difference vector is calculated for each piece of acceleration data obtained during a movement period. A movement direction is calculated by calculating a sum of difference vectors while assigning weights thereto. Here, in a method of calculating a sum of difference vectors without assigning weights thereto, the first movement direction may not be accurately recognized, depending on the result of detection during the predetermined period. For example, when a value of acceleration data first obtained during the predetermined period and a value of acceleration data last obtained during the predetermined period have substantially the same value, the sum of the difference vectors is "0", so that the first movement direction cannot be accurately recognized. In contrast to this, according to the seventeenth aspect, a sum is calculated, taking the above-described weight into consideration. Therefore, even if the two pieces of acceleration data obtained first and last during the predetermined period have the same value, a vector indicating the sum is not "0". According to the seventeenth aspect, a component of one having a large magnitude of the difference vectors is represented by the sum, thereby making it possible to accurately calculate the first movement direction.

According to the eighteenth aspect, it is possible to easily detect a start time and an end time during a period when the input device is moved.

According to the nineteenth aspect, the movement period can be easily detected using an acceleration value with respect one predetermined axis of a three-axis acceleration sensor. Also, acceleration values with respect to two axes other than the one predetermined axis can be used to easily calculate a gravity direction with respect to directions of the two axes.

According to the twentieth aspect, a gravity direction applied to the input device as well as a movement direction thereof are calculated. From acceleration data obtained from the input device, two kinds of information indicating states of the input device (i.e., a movement direction and a gravity direction) are calculated. The game apparatus performs a game process, reflecting the two kinds of information on a game operation. Thereby, according to the sixteenth aspect, the player is allowed to perform a complicated game operation based on the two kinds of states of the input device using a simple configuration in which only one sensor is employed.

According to the twenty-first aspect, limit acceleration data is selected from an acceleration data group by the selecting means, and a value of at least one piece of limit acceleration data is corrected by the correcting means so that the value is outside a detectable range of the acceleration sensor. By the correction, the game apparatus can correct a value of an acceleration obtained from the acceleration sensor into a value more approximate to an actual value. In other words, the value of an acceleration obtained from the acceleration sensor can be corrected into a more accurate value.

According to the twenty-second aspect, the correcting means corrects a value of limit acceleration data using an extension line. The value of the limit acceleration data is corrected so as to be a value on the extension line, thereby making it possible to easily determine the corrected value.

According to the twenty-third aspect, a slope of an extension line is determined based on the first direction vector and the second direction vector. Thereby, a curve indicating transition of values of acceleration data before and after taking a limit value, and the extension line can be connected in a smooth manner (continuous change in the slope). Therefore, the transition of accelerations during the time when actual values which exceed the limit value range cannot be detected can be accurately estimated as an approximation to actual transition.

According to the twenty-fourth aspect, the third direction vector indicates the transition of accelerations over the whole movement period. Therefore, by determining the slope of an extension line based on the third direction vector, the tendency of the whole acceleration transition over the movement period can be reflected on the slope. Thereby, an extension line which is more approximate to actual transition of accelerations, can be calculated.

According to the twenty-fifth, the slope of an extension line is determined based on the first to third direction vectors, thereby making it possible to calculate an extension line which is more approximate to actual transition of accelerations.

According to the twenty-sixth aspect, the first and second direction vectors are each calculated using two coordinate values, the game apparatus 3 can calculate the first and second direction vectors with high speed.

According to the twenty-seventh aspect, it is possible to easily calculate the third direction vector on which transition of accelerations over the whole movement period is accurately reflected.

According to the twenty-eighth aspect, the distance from a position on an extension line most distant from the detectable range of the acceleration sensor to the range, is determined, depending on the number of pieces of limit acceleration data. Here, a large number of pieces of limit acceleration data means a long period during which actual values which exceed a limit value range cannot be detected. The value of an actual acceleration during the period is considered to increase, depending on the length of the period. Therefore, by increasing the distance, depending on the number of pieces of limit acceleration data, it is possible to calculate an extension line which is more approximate to actual acceleration transition.

According to the twenty-ninth aspect, the shape of an extension line can be determined by determining a control point (s), thereby making it possible to easily calculate the extension line.

According to the thirtieth aspect, when acceleration data indicating a two-dimensional acceleration value is used in a game process, acceleration data obtained from the acceleration sensor can be corrected into a more accurate value.

According to the thirty-first aspect, when acceleration data indicating a one-dimensional acceleration value is used in a game process, acceleration data obtained from the acceleration sensor can be corrected into a more accurate value.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
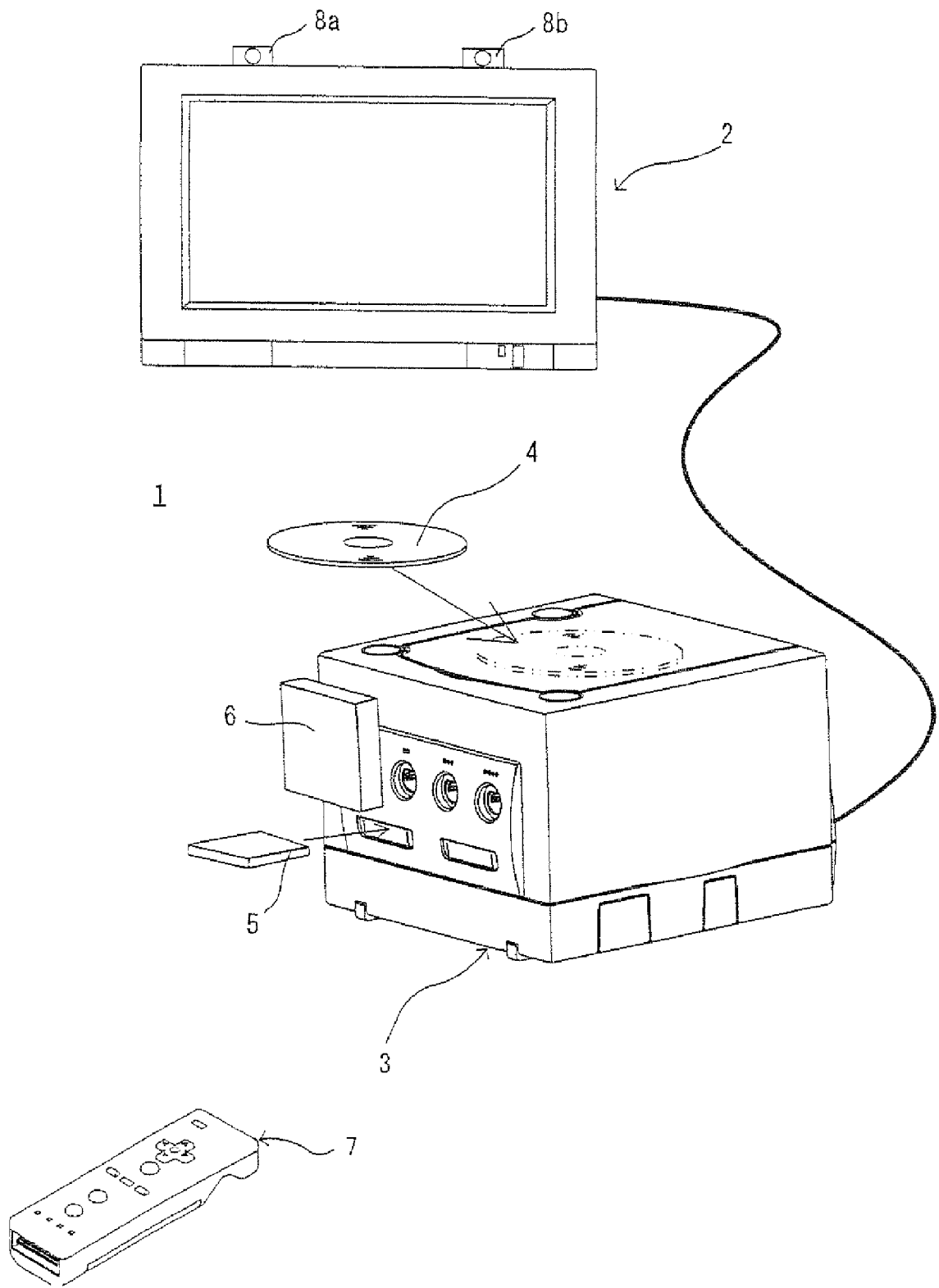
FIG. 1 is a diagram illustrating an outer appearance of a game system including a game apparatus 3 according to an embodiment of the present invention.

Referring to FIG. 1, a game system 1 including a game apparatus according to an embodiment of the present invention will be described. FIG. 1 is a diagram illustrating an outer appearance of the game system 1. Hereinafter, a game apparatus and a game program according to this embodiment will be described using a stationary game apparatus as an example.

In FIG. 1, the game system 1 is composed of a stationary game apparatus (hereinafter simply referred to as a game apparatus) 3 which is connected via a connection code to a display (hereinafter referred to as a monitor) 2 with a loudspeaker, such as a television set for home use or the like, and a controller 7 which inputs operation data to the game apparatus 3. Two markers 8a and 8b are provided in the vicinity of the monitor 2 (e.g., on an upper side of the screen in FIG. 1). Specifically, the markers 8a and 8b are infrared LEDs which output infrared light toward the front of the monitor 2. The game apparatus 3 is connected via a connection terminal to a reception unit 6. The reception unit 6 receives operation data wirelessly transmitted from the controller 7, so that the controller 7 and the game apparatus 3 are connected together via wireless communication. Note that, in other embodiments, the controller 7 and the game apparatus 3 are connected together via wired communication. An optical disc 4 which is an exemplary information storing medium changeable with respect to the game apparatus 3, is detachably attached to the game apparatus 3. On an upper major surface of the game apparatus 3, a power ON/OFF switch for the game apparatus 3, a reset switch for a game process, and an OPEN switch for opening an upper lid of the game apparatus 3, are provided. Here, the lid is opened by a player pushing down the OPEN switch, so that the optical disc 4 can be attached or detached.

An external memory card 5 carrying, for example, a backup memory for fixedly storing saved data or the like, is detachably attached to the game apparatus 3 as required. The game apparatus 3 executes a game program or the like stored on the optical disc 4, and displays a result of the execution as a game image on the monitor 2. The game apparatus 3 can also reproduce a game state which was executed in the past, using saved data stored in the external memory card 5, and display a game image on the monitor 2. The player of the game apparatus 3 can enjoy events of the game by operating the controller 7 while watching a game image displayed on the monitor 2.

The controller 7 wirelessly transmits operation data from a communication section 36 (described below) included therein to the game apparatus 3 to which the reception unit 6 is connected, using, for example, a Bluetooth(R) technique. The controller 7 is provided with an operation section composed of a plurality of operation buttons. As will be clearly described below, the controller 7 comprises an acceleration sensor 37 (described below) for detecting an acceleration in a linear direction. Data indicating the acceleration detected by the acceleration sensor 37 is transmitted as a part of the operation data to the game apparatus 3. Based on the data indicating the acceleration, the game apparatus 3 can calculate a motion and/or an attitude of the controller 7, and execute a process depending on the motion or the like as appropriate. The controller 7 also comprises an image capture information computing section 35 (described below) for capturing an image viewed from the controller 7. The image capture information computing section 35 captures an image of each of the markers 8a and 8b provided in the vicinity of the monitor 2 as objects to be captured. The game apparatus 3 performs a computation process based on these images, thereby making it possible to execute a process depending on the position and the attitude of the controller 7.

Next, a configuration of the game apparatus 3 will be described with reference to FIG. 2. Note that FIG. 2 is a functional block diagram of the game apparatus 3.

Figure 2:
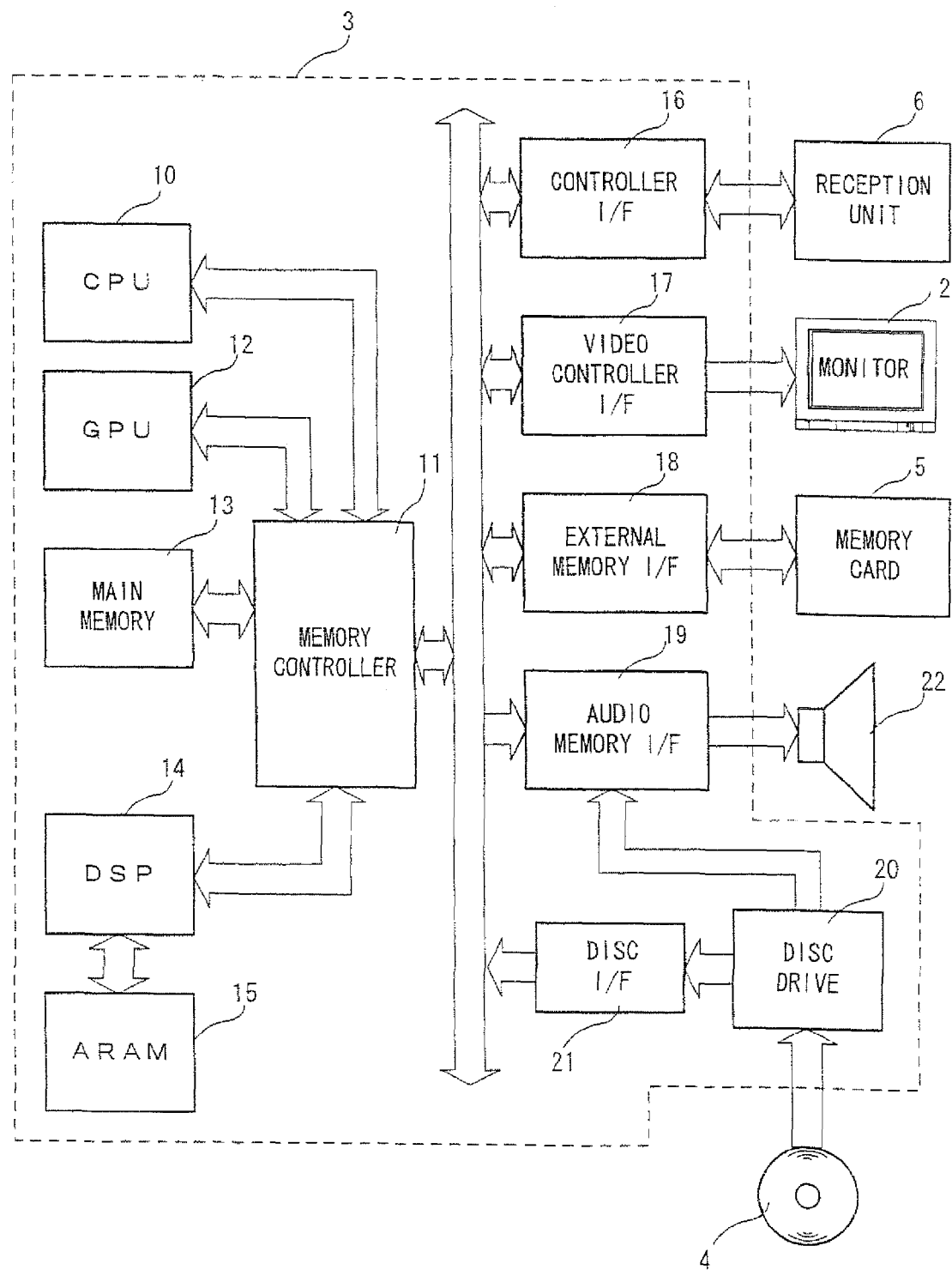
FIG. 2 is a functional block diagram showing a game apparatus 3.

In FIG. 2, the game apparatus 3 comprises, for example, a RISC CPU (central processing unit) 10 which executes various programs. The CPU 10 executes a start-up program stored in a boot ROM (not shown) and performs, for example, initialization of memories, such as a main memory 13 and the like, before executing a game program stored in the optical disc 4, and performing, for example, a game process corresponding to the game program. A GPU (Graphics Processing Unit) 12, the main memory 13, a DSP (Digital Signal Processor) 14, and an ARAM (Audio RAM) 15 are connected via a memory controller 11 to the CPU 10. A controller I/F (interface) 16, a video I/F 17, an external memory I/F 18, an audio I/F 19, and a disc I/F 21 are connected via a predetermined bus to the memory controller 11. The reception unit 6, the monitor 2, the external memory card 5, a loudspeaker 22, and a disc drive 20 are connected to the controller I/F 16, the video I/F 17, the external memory I/F 18, the audio I/F 19, and the disc I/F 21, respectively.

The GPU 12 performs image processing based on an instruction from the CPU 10, and is composed of, for example, a semiconductor chip which performs a calculation process required for 3D graphics display. The GPU 12 performs image processing using a memory specialized for image processing or a memory area which is a portion of the main memory 13. The GPU 12 uses these to generate game image data or movie video to be displayed on the monitor 2, and outputs the data via the memory controller 11 and the video I/F 17 to the monitor 2 as appropriate.

The main memory 13 is a memory area used in the CPU 10, and stores a game program or the like required for a process by the CPU 10 as appropriate. For example, the main memory 13 stores a game program, various data, or the like read from the optical disc 4 by the CPU 10. The game program, the various data, or the like stored in the main memory 13 are executed by the CPU 10.

The DSP 14 processes sound data or the like which is generated in the CPU 10 when a game program is executed. The ARAM 15 for storing the sound data or the like is connected to the DSP 14. The ARAM 15 is used when the DSP 14 performs a predetermined process (e.g., storage of a read-ahead game program or sound data). The DSP 14 reads sound data stored in the ARAM 15, and outputs the data via the memory controller 11 and the audio I/F 19 to the loudspeaker 22 included in the monitor 2.

The memory controller 11 performs a centralized control of data transfer. The above-described various I/F are connected to the memory controller 11. The controller I/F 16 is composed of, for example, four controller I/Fs, and communicably connects an external apparatus which can be engaged with the four controller I/Fs via connectors thereof, and the game apparatus 3. For example, the reception unit 6 is engaged with the connector to be connected via the controller I/F 16 to the game apparatus 3. As described above, the reception unit 6 receives operation data from the controller 7, and outputs the operation data via the controller I/F 16 to the CPU 10. Note that, in other embodiments, the game apparatus 3 may comprise a reception module for receiving operation data transmitted from the controller 7, instead of the reception unit 6. In this case, the operation data received by the reception module is output via a predetermined bus to the CPU 10. The monitor 2 is connected to the video I/F 17. The external memory card 5 is connected to the external memory I/F 18, thereby making it possible to access the backup memory or the like provided in the external memory card 5. The loudspeaker 22 included in the monitor 2 is connected to the audio I/F 19 so that sound data read from the ARAM 15 by the DSP 14 or sound data directly output from the disc drive 20 can be output from the loudspeaker 22. The disc drive 20 is connected to the disc I/F 21. The disc drive 20 reads data stored at a predetermined read-out position on the optical disc 4, and outputs the data to the bus and the audio I/F 19 of the game apparatus 3.

Figure 3A:
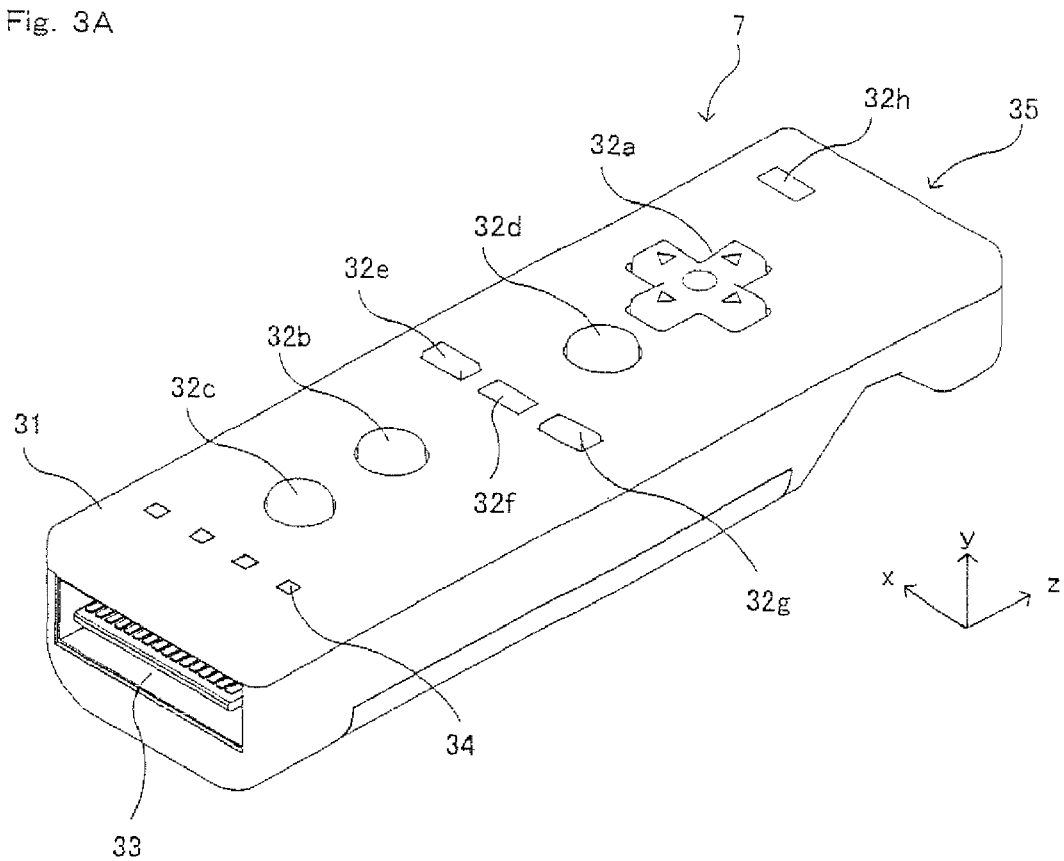
FIG. 3A is a perspective view of a controller 7.
Figure 3B:
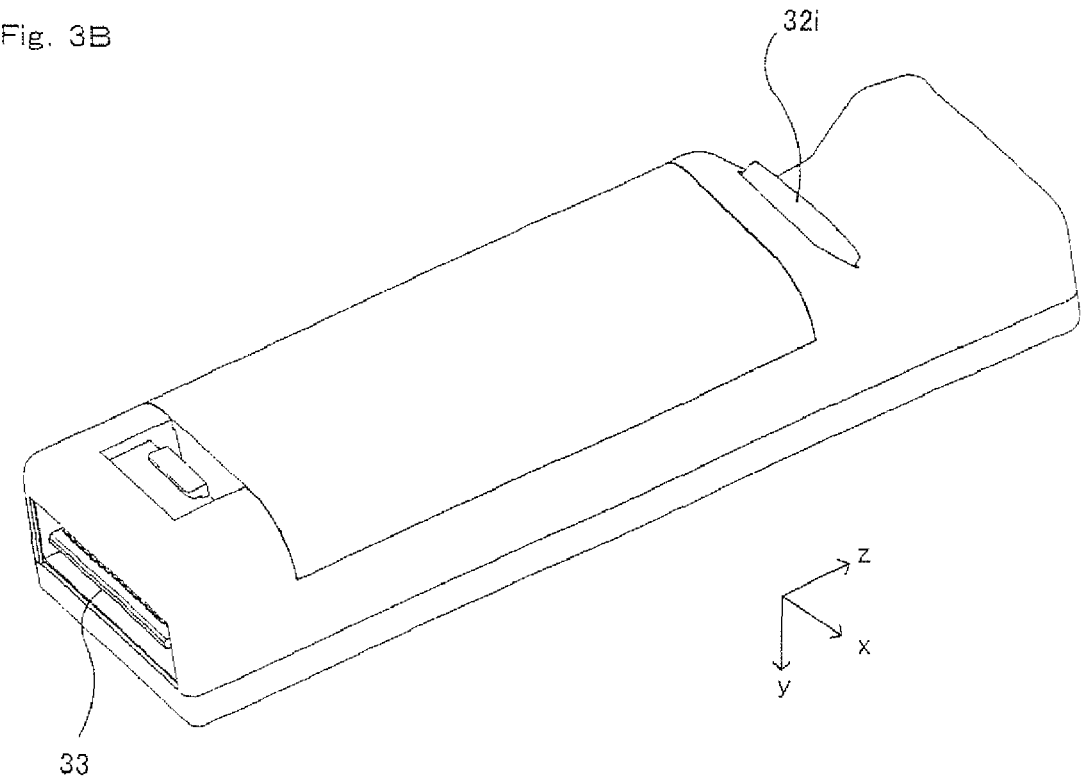
FIG. 3B is a perspective view of the controller 7.
Figure 4:
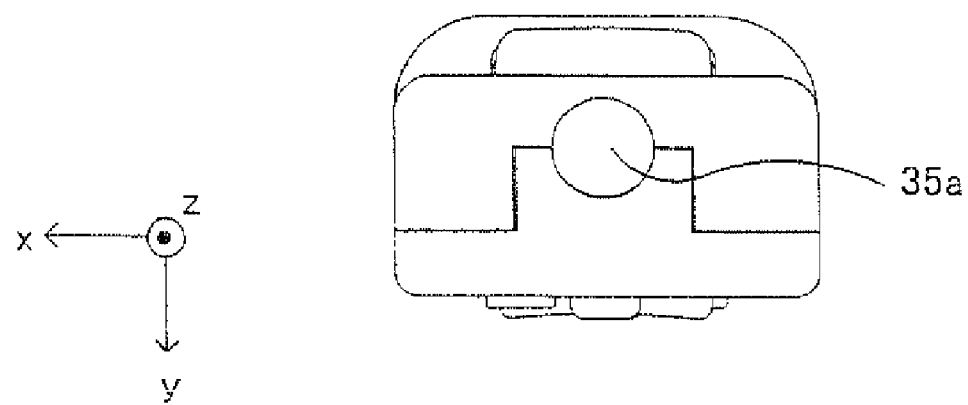
FIG. 4 is a front view of the controller 7.

Next, the controller 7 will be described with reference to FIGS. 3A to 8. FIGS. 3A to 4 are perspective views of an outer appearance structure of the controller 7. FIG. 3A is a perspective view of the controller 7 as viewed from the top and the rear, and FIG. 3B is a perspective view of the controller 7 as viewed from the bottom and the rear. FIG. 4 is a front view of the controller 7.

In FIGS. 3A, 3B, and 4, the controller 7 has a housing 31 formed by, for example, plastic molding. The housing 31 is in the shape of substantially a rectangular parallelepiped in which a front-to-rear direction (a Z-axis direction in FIGS. 3A and 3B) is a longitudinal direction. The whole housing 31 has a size which allows an adult and a child to hold the controller 7 with one hand. The player can perform game operations by using the controller 7, i.e., pushing down buttons provided on the controller 7, moving the controller 7 itself, or changing a position and an attitude of the controller 7 itself. For example, the player can operate an object to be operated which appears in game space, by changing a tilt of the controller 7 or moving the controller 7 (e.g., shaking the controller 7 in an arbitrary direction). Also, for example, the player can operate the object to be operated by rotating the controller 7 around the longitudinal direction as an axis, or changing a position on the screen which is pointed by the controller 7. As used herein, the term "position on the screen which is pointed by the controller 7" ideally refers to a position of an intersection of a straight line extending from a front end of the controller 7 in the longitudinal direction and the screen of the monitor 2, but does not need to be exactly such a position, and may be a position which is in the vicinity thereof and can be calculated by the game apparatus 3. Hereinafter, a position on the screen which is pointed by the controller 7 is referred to as a "pointed position of the controller 7". The longitudinal direction of the controller 7 (the housing 31) may be referred to as a "pointing direction of the controller 7".

The housing 31 is provided with a plurality of operation buttons. On an upper surface of the housing 31, a cross key 32a, an X button 32b, an Y button 32c, an A button 32d, a select switch 32e, a menu switch 32f, and a start switch 32g are provided. On the other hand, a hollow portion is formed on a lower surface of the housing 31, and a B button 32i is provided on a rear slope surface of the hollow portion. These operation keys (buttons) are assigned with respective functions, depending on a game program executed by the game apparatus 3. These functions are not directly involved with the description of the present invention and will not be described in detail. Further, a power switch 32h for remotely switching ON/OFF the power source of the game apparatus 3 is provided on the upper surface of the housing 31.

Figure 5A:
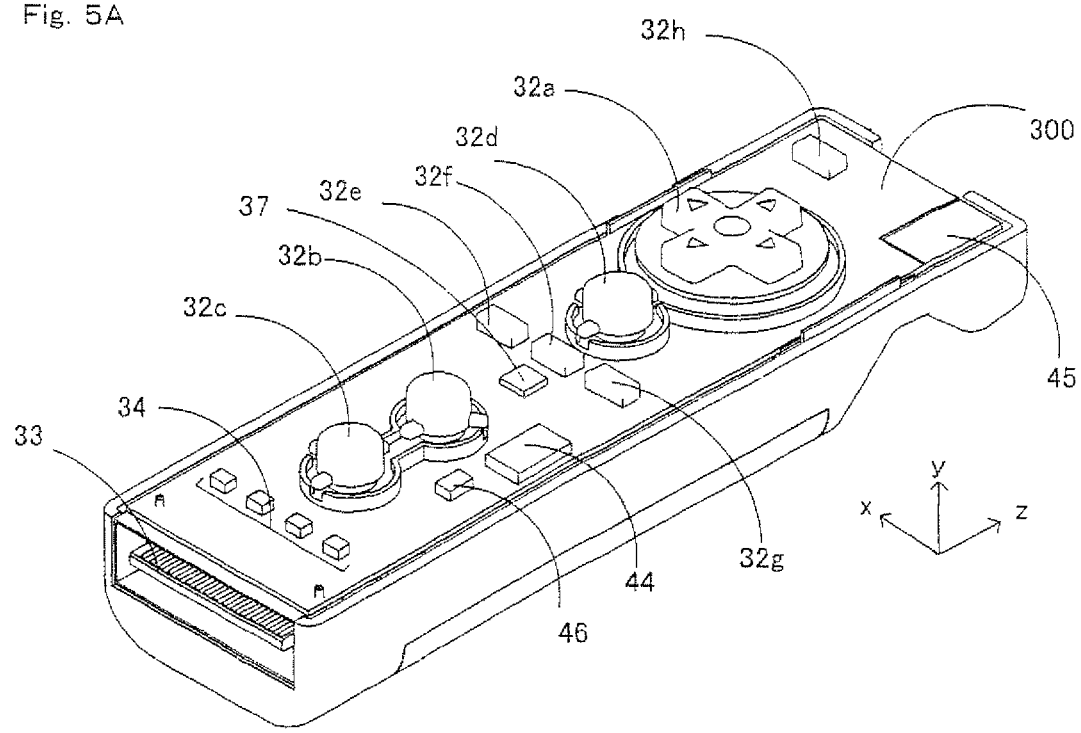
FIG. 5A is a diagram illustrating an internal structure of the controller 7.
Figure 5B:
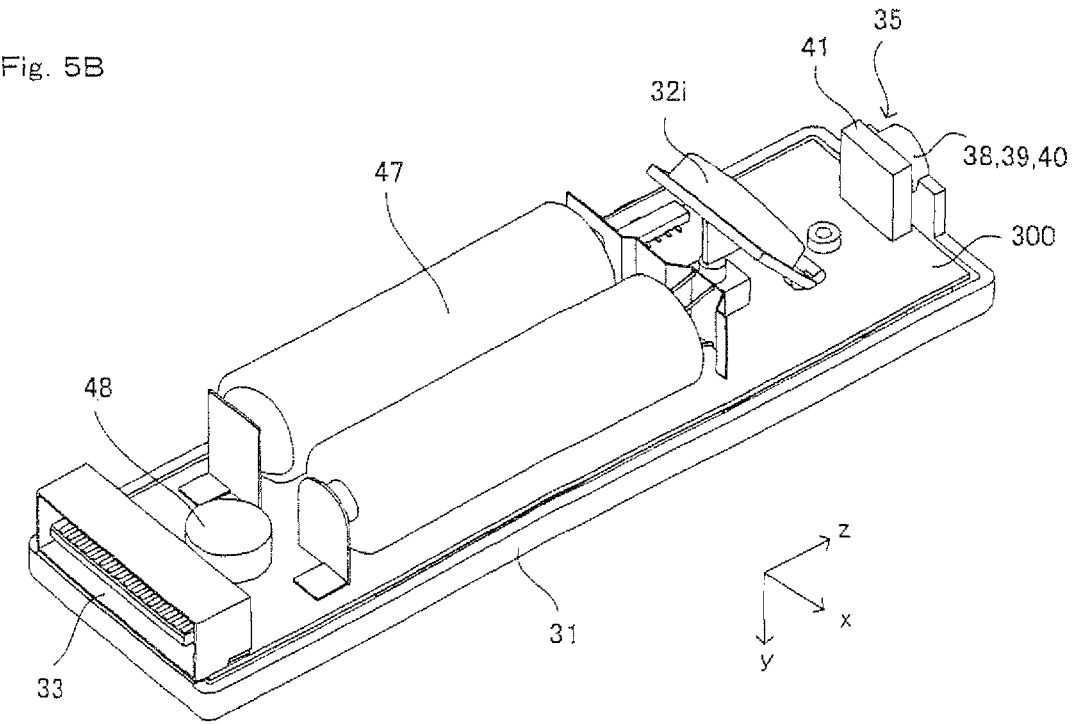
FIG. 5B is a diagram illustrating the internal structure of the controller 7.

The controller 7 has the image capture information computing section 35 (FIG. 5B). As illustrated in FIG. 4, a light entering opening 35a of the image capture information computing section 35 is provided on a front surface of the housing 31. On the other hand, a connector 33 is provided on a rear surface of the housing 31. The connector 33 is, for example, a 32-pin edge connector which is utilized so as to connect other apparatuses to the controller 7. A plurality of LEDs 34 are provided on a rear side of the upper surface of the housing 31. Here, the controller 7 is assigned with controller identification (number) so as to distinguish it from other controllers 7. The LEDs 34 are used so as to inform the player of controller identification currently set for the controller 7. Specifically, when operation data is transmitted from the controller 7 to the game apparatus 3, one of the plurality of LEDs 34 is turned ON, depending on the controller identification.

Next, an internal structure of the controller 7 will be described with reference to FIGS. 5A and 5B. FIGS. 5A and 5B are diagrams illustrating the internal structure of the controller 7. Note that FIG. 5A is a perspective view of the controller 7 where an upper housing (a portion of the housing 31) is cut away. FIG. 5B is a perspective view of the controller 7 where a lower housing (a portion of the housing 31) is cut away. FIG. 5B illustrates a perspective view of a base board 300 of FIG. 5A as viewed from a bottom surface thereof.

In FIG. 5A, the base board 300 is fixedly provided inside the housing 31. On an upper major surface of the base board 300, operation buttons 32a to 32h, an acceleration sensor 37, the LEDs 34, a quartz oscillator 46, a radio module 44, an antenna 45, and the like are provided. These are connected to a microcomputer 42 (see FIG. 6) via a conductor (not shown) formed on the base board 300 or the like. The controller 7 functions as a wireless controller by means of the radio module 44 and the antenna 45. Note that the quartz oscillator 46 generates a basic clock for the microcomputer (described below).

On the other hand, in FIG. 5B, the image capture information computing section 35 is provided at a front edge of a lower major surface of the base board 300. The image capture information computing section 35 is composed of an infrared filter 38, a lens 39, an image capturing element 40 (e.g., a CMOS image sensor, a CCD image sensor, etc.), and an image processing circuit 41, which are attached to the lower major surface of the base board 300 in this order from the front of the controller 7. The connector 33 is attached to a rear edge of the lower major surface of the base board 300. The A button 32i is attached at the rear of the image capture information computing section 35 and on the lower major surface of the base board 300. Batteries 47 are housed at the rear of the A button 32i. A vibrator 48 is attached on the lower major surface of the base board 300 and between the batteries 47 and the connector 33. The vibrator 48 may be, for example, a vibration motor or solenoid. Vibration occurs in the controller 7 by an action of the vibrator 48, and is transferred to the player who is holding the controller 7, thereby achieving a so-called game supporting the vibration feature.

Note that the shape of the controller 7 and the shapes, number, positions, and the like of the operation keys of FIGS. 3A to 5B are only for illustrative purposes, and the present invention can be achieved with other shapes, number, and positions. For example, if the acceleration sensor is shifted in either of the positive and negative directions of the X axis, a rotation of the acceleration sensor about the Z axis may be more readily calculated, or if the vibrator is disposed closer to the tip of the controller, the whole controller may be more easily swung, for example. The position (the light entering surface 35a of the image capture information computing section 35) of the image capture information computing section 35 in the controller 7 may not be on the front surface of the housing 31, and may be provided on other surfaces if light can be taken in from the outside of the housing 31. In this case, the above-described "pointing direction of the controller 7" is a direction perpendicular to the light entering surface, i.e., the image capturing direction of the image capturing element 40.

Figure 6:
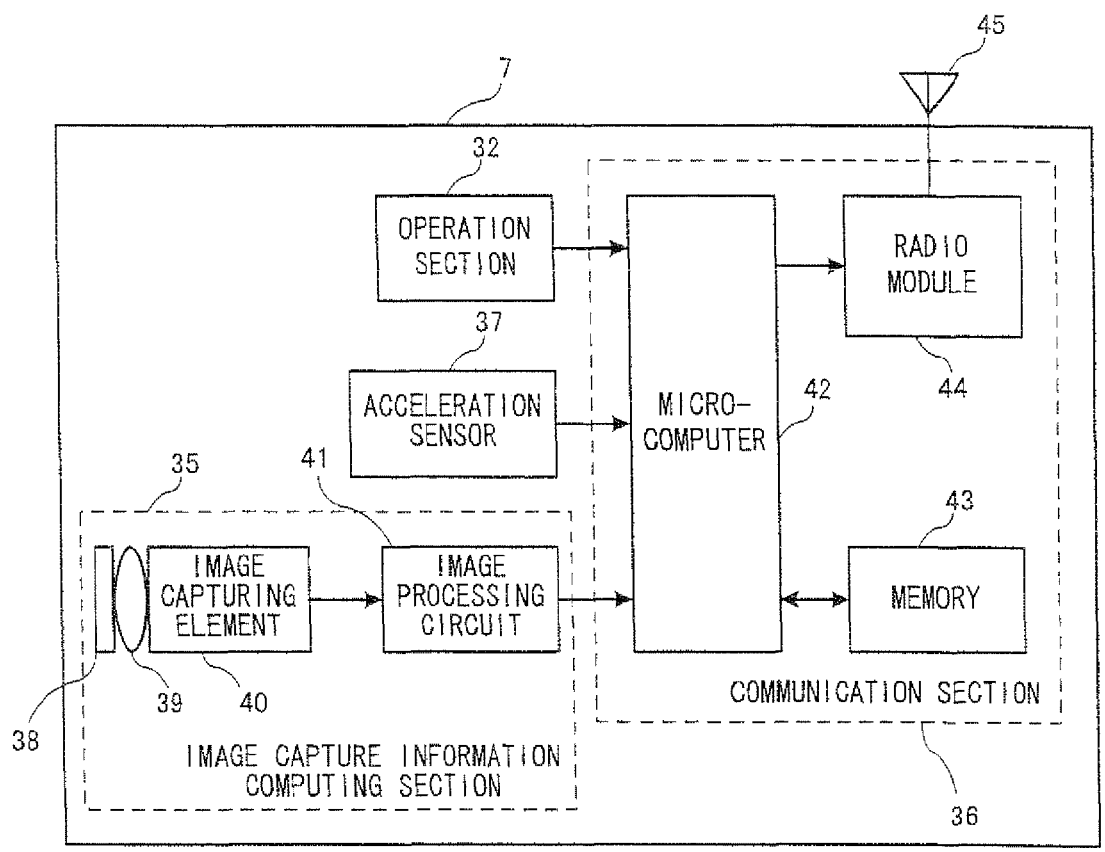
FIG. 6 is a block diagram illustrating a configuration of the controller 7.

FIG. 6 is a block diagram illustrating a configuration of the controller 7. The controller 7 comprises an operation section 32 (various operation keys), the image capture information computing section 35, the communication section 36, and the acceleration sensor 37. Note that, in this embodiment, the controller 7 only needs to comprise an acceleration detecting means (the acceleration sensor 37), and may not comprise the operation section 32 and the image capture information computing section 35.

The acceleration sensor 37 detects an acceleration (including a gravity acceleration) of the controller 7, i.e., detects a force (including gravity) applied to the controller 7. Of accelerations applied to a detection portion of the acceleration sensor 37, the acceleration sensor 37 detects a value of an acceleration in a linear direction along a sensing-axis direction. For example, in the case of a multi-axis acceleration sensor having two or more axes, an acceleration component along each axis (linear acceleration) is detected as an acceleration applied to the detection portion of the acceleration sensor. For example, a three- or two-axis acceleration sensor 37 may be those available from Analog Devices, Inc. or STMicroelectronics N.V.

In this embodiment, the acceleration sensor 37 detects a linear acceleration along each of three axes extending in a vertical direction (y-axis direction in FIGS. 3A and 3B), a lateral direction (x-axis direction in FIGS. 3A and 3B), and a front-to-rear direction (z-axis direction in FIGS. 3A and 3B), where the controller 7 is used as a reference. Since the acceleration sensor 37 detects an acceleration with respect to a linear direction along each axis, an output of the acceleration sensor 37 indicates a value of a linear acceleration along each axis. In other words, the detected acceleration is represented as a three-dimensional vector in an xyz coordinate system provided using the controller 7 as a reference. Hereinafter, a vector having acceleration values with respect to a plurality of axes which are detected by the acceleration sensor 37, is referred to as an acceleration vector.

Figure 7:
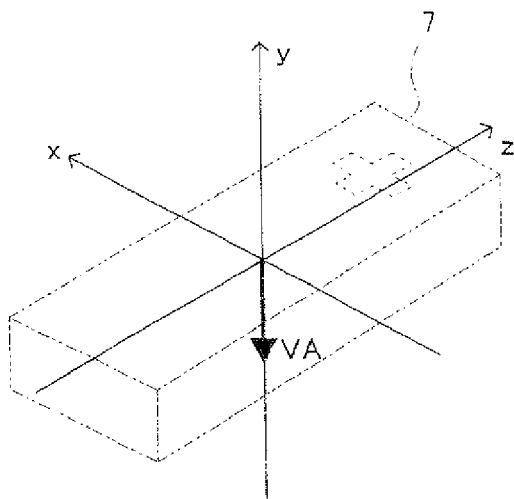
FIG. 7 is a diagram illustrating a relationship between a tilt of the controller 7 and an output of an acceleration sensor.
Figure 8:
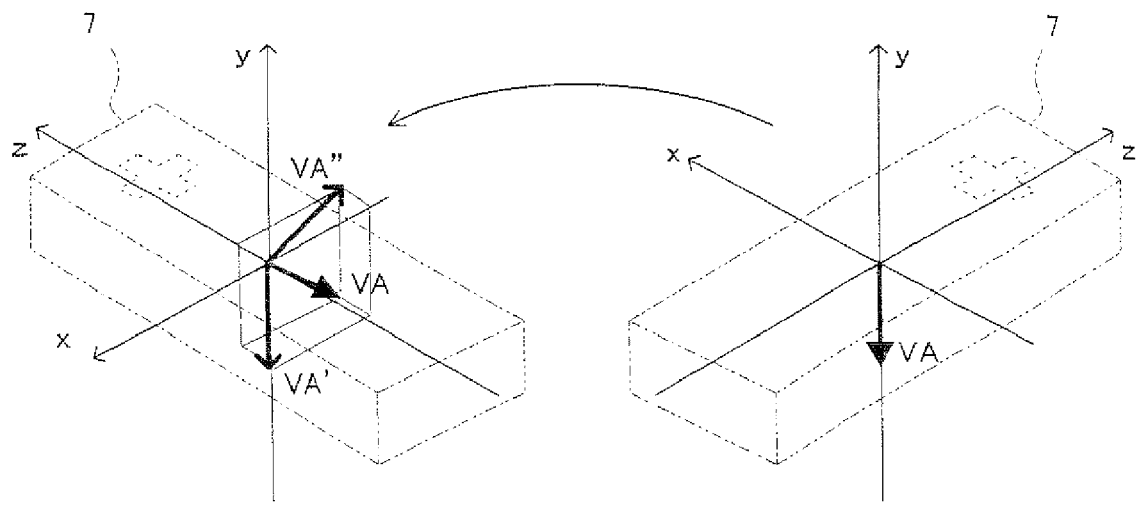
FIG. 8 is a diagram illustrating a relationship between a tilt of the controller 7 and an output of an acceleration sensor.

FIGS. 7 and 8 are diagrams a relationship between a motion of the controller 7 and an output of the acceleration sensor 37. FIG. 7 illustrates a state where a gravity acceleration (a vector VA in FIG. 7) points downward where the controller 7 is a reference. Note that, in FIG. 7, the controller 7 is assumed to be in a horizontal and stationary state. In this state, gravity (gravity acceleration) is invariably applied to the controller 7, so that the acceleration vector VA indicates only a gravity acceleration. For example, in the state of FIG. 7, the acceleration vector VA points in the negative y-axis direction. Specifically, a gravity acceleration of 1 G is applied to the acceleration sensor 37 in the negative y-axis direction, and x-axis and z-axis accelerations of the acceleration sensor 37 are substantially zero. Note that, in this embodiment, a magnitude of an acceleration detected by the acceleration sensor 37 when the controller 7 is at rest (i.e., the acceleration magnitude when the acceleration detected by the acceleration sensor 37 indicates only a gravity acceleration) is represented by 1. For example, values of components of the acceleration vector VA detected in the state of FIG. 7 are (x, y, z)=(0, −1, 0).

FIG. 8 illustrates a state when the controller 7 is being moved. FIG. 8 illustrates a state when the controller 7 is moving in a manner which causes a front end portion of the controller 7 to draw an arc having a radius larger than that of a rear end portion thereof, in parallel to the x-z plane and from the negative x-axis direction side to the positive x-axis direction side. The controller 7 is moved as illustrated in FIG. 8, typically when a player swings (moves) the controller 7 from the right to the left while holding the controller 7 with a hand so that a front surface of the controller 7 points a forward direction with respect to the player. In the state of FIG. 8, an inertial force is applied to the acceleration sensor 37 due to the movement of the controller 7 in addition to gravity. Therefore, the acceleration sensor 37 detects an acceleration VA which is a combination of an acceleration VA' caused by gravity applied to the controller 7, and an acceleration VA" caused by the inertial force due to the movement of the controller 7 (appears a combined vector of x- and y-axis components). Based on the acceleration VA thus detected, the game apparatus 3 calculates a direction (swing direction) in which the controller 7 is swung, which will be specifically described below. Note that the "swing direction" as used herein refers to a movement direction (absolute direction) of the controller 7 with respect to a gravity direction, which is distinguished from a movement direction (relative direction) using an orientation of the controller 7 as a reference.

There is a limitation on the magnitude of an acceleration which can be detected by the acceleration sensor 37, depending on characteristics of the device. In this embodiment, a limit value of a range within which the acceleration sensor 37 achieves detection is assumed to be "±2.2" with respect to each axis. Specifically, the acceleration sensor 37 outputs an acceleration value within the range of −2.2 to 2.2, even when an actual acceleration is larger than 2.2 or smaller than −2.2.

Data (acceleration data) indicating an acceleration (acceleration vector) detected by the acceleration sensor 37 is output to the communication section 36. Note that, in this embodiment, the communication section 36 of the controller 7 outputs the acceleration data to the game apparatus 3 successively (once per 0.5 ms). The game apparatus 3 calculates a swing direction of the controller 7 based on the acceleration data, and executes a game process depending on the swing direction. Note that, since the acceleration sensor 37 detects an acceleration of a linear component along each axis, the game apparatus 3 cannot directly detect the swing direction of the controller 7. Therefore, the swing direction of the device including the acceleration sensor 37 is calculated by subjecting an acceleration detected for each axis of the acceleration sensor to a predetermined computation process.

Referring back to FIG. 6, the image capture information computing section 35 is a system for analyzing image data captured by an image capturing means to determine an area having a high luminance of the image, and calculate a center-of-gravity position or a size of the area. The image capture information computing section 35 has a sampling frequency of, for example, a maximum of about 200 frames/sec, and can track and analyze a relatively high-speed motion of the controller 7.

The image capture information computing section 35 includes an infrared filter 38, a lens 39, an image capturing element 40, and an image processing circuit 41. The infrared filter 38 passes only infrared light of light entering the front of the controller 7. Here, the markers 8a and 8b which are provided in the vicinity of the display screen of the monitor 2 are infrared LEDs which emit infrared light toward the front of the monitor 2. Therefore, by providing the infrared filter 38, the images of the markers 8a and 8b can be more accurately captured. The lens 39 collects infrared light passing through the infrared filter 38 and causes the light to enter the image capturing element 40. The image capturing element 40 may be, for example, a solid-state image capturing element, such as a CMOS sensor or a CCD, and captures infrared light collected by the lens 39. Therefore, the image capturing element 40 captures only infrared light passing through the infrared filter 38 to generate image data. Hereinafter, an image captured by the image capturing element 40 is referred to as a captured image. The image data generated by the image capturing element 40 is processed by the image processing circuit 41. The image processing circuit 41 calculates positions of objects whose images are to be captured (markers 8a and 8b) in the captured image.

When a captured image is input, the image processing circuit 41 calculates coordinates indicating a position of an area which satisfies a predetermined condition in the captured image, for each area. Here, the predetermined condition is for specifying an image of an object to be captured (object image). Specifically, the predetermined condition is that an area has a luminance higher than or equal to a predetermined value (high luminance area) and the area has a size within a predetermined range. Note that the predetermined condition may be for detection of an object whose image is to be captured, or in other embodiments, may include a condition for a color of an image.

When a position of an object image is calculated, the image processing circuit 41 initially detects the above-described high luminance area as a candidate for the object image from the area of a captured image. This is because an object image appears as a high illuminance area in the image data of a captured image. Next, based on a size of the high luminance area thus specified, the image processing circuit 41 determines whether or not the high luminance area is the object image. The captured image may contain an image caused by sunlight through a window or light of a fluorescent tube in a room in addition to the images (object images) of the two markers 8a and 8b. In this case, an image may appear as a high illuminance area in addition to the images of the markers 8a and 8b. The above-described determination process is for distinguishing the images of the markers 8a and 8b (object images) from other images to accurately detect the object images. Specifically, in the determination process, it is determined whether or not the detected high luminance area has a size within a predetermined range. When the high luminance area has a size within the predetermined range, the high luminance area is determined to be the object image. When the size of the high luminance area is not within the predetermined range, the high luminance area is determined to be an image other than the object image.

Further, for a high luminance area which is determined to represent the object image as a result of the determination process, the image processing circuit 41 calculates a position of the high luminance area. Specifically, a position of the center of gravity of the high luminance area is calculated. Note that the position of the center of gravity can be calculated with a scale finer than the resolution of the image capturing element 40. For example, even when an image captured by the image capturing element 40 has a resolution of 126× 96, the position of the center of gravity can be calculated with a scale of 1024×768. In this case, the coordinates of the position of the center of gravity is represented with integer values in the range of (0, 0) to (1024, 768).

As described above, the image processing circuit 41 calculates coordinates indicating a position of an area which satisfies the predetermined condition in the captured image, for each area. The image processing circuit 41 outputs the calculated coordinates to the microcomputer 42 of the communication section 36. The coordinate data is transmitted as operation data to the game apparatus 3 by the microcomputer 42. Since the coordinates vary depending on an orientation (attitude) of the controller 7 itself, the game apparatus 3 can calculate an orientation or a position of the controller 7. Note that, in this embodiment, the coordinate data is not used in a game process, so that the controller 7 may not comprise the image capture information computing section 35.

The operation section 32 corresponds to each of the operation keys 32a to 32i, such as the cross key 32a and the like, and outputs data indicating an input state of each of the operation keys 32a to 32i (whether or not each of the operation keys 32a to 32i has been pushed down) to the microcomputer 42 of the communication section 36.

The communication section 36 includes the microcomputer 42, a memory 43, the radio module 44, and the antenna 45. The microcomputer 42 controls the radio module 44 which wirelessly transmits data obtained by the microcomputer 42 while using the memory 43 as a memory area.

Data output from the operation section 32, the image capture information computing section 35, and the acceleration sensor 37 to the microcomputer 42 is temporarily stored in the memory 43. Here, wireless transmission from the communication section 36 to the reception unit 6 is performed in predetermined cycles. Since a game process is generally performed in units of 1/60 sec (one frame time), transmission is preferably performed in cycles which are shorter than 1/60 sec. When the timing of transmission to the reception unit 6 arrives, the microcomputer 42 outputs data stored in the memory 43 as operation data to the radio module 44. The radio module 44 uses, for example, a Bluetooth(R) technique to modulate a carrier wave having a predetermined frequency with the operation data, and emits a resultant weak radio wave signal from the antenna 45. In other words, the operation data is modulated by the radio module 44 into the weak radio wave signal, which is in turn transmitted from the controller 7. The weak radio wave signal is received by the reception unit 6 on the game apparatus 3 side. By demodulation or decoding of the received weak radio wave signal, the game apparatus 3 can obtain the operation data. The CPU 10 of the game apparatus 3 performs a game process based on the obtained operation data and a game program.

By using the controller 7, the player can perform game operations, such as changing the attitude of the controller 7, moving the position of the controller 7 itself, rotating the controller 7, and the like, in addition to a conventional general game operation of pushing down various operation keys.

Figure 9:
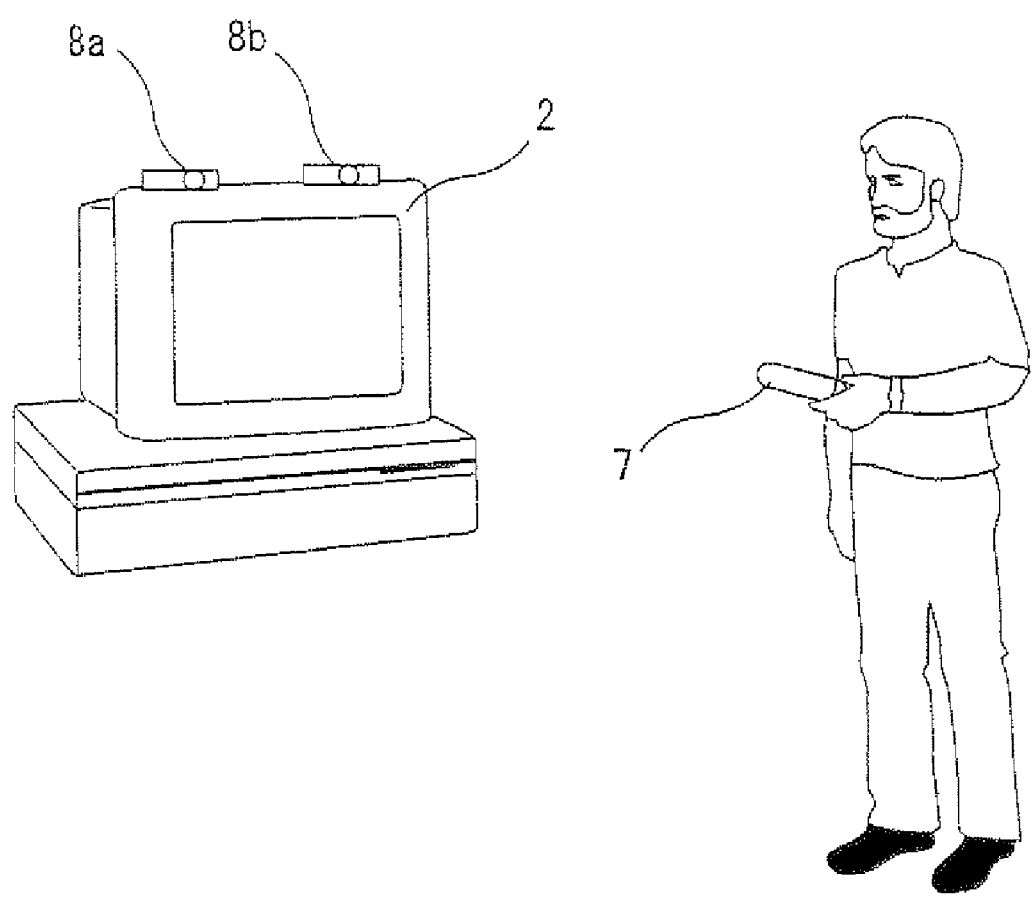
FIG. 9 is a diagram for roughly explaining a state when a game operation is performed using the controller 7.

FIG. 9 is a diagram roughly illustrating a state in which a game operation is performed using the controller 7. When a game is played using the controller 7 in the game system 1, the player holds the controller 7 with one hand. In this embodiment, the player swings (moves) the held controller 7 in an arbitrary direction to perform a game operation.

Figure 10:
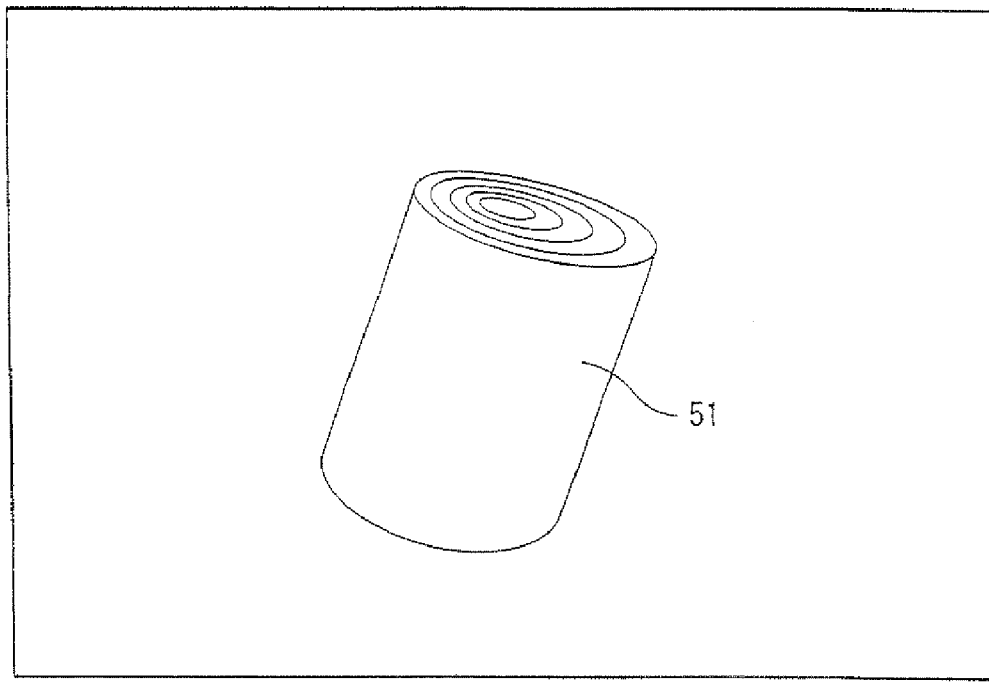
FIG. 10 is a diagram illustrating an exemplary game screen displayed on a monitor 2 in the embodiment.
Figure 11:
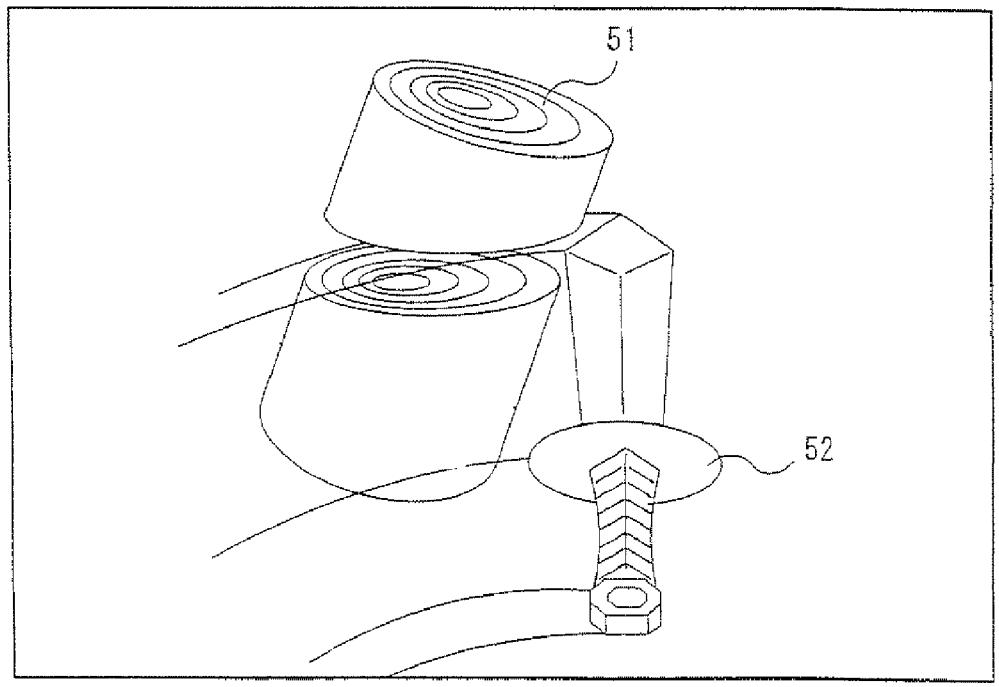
FIG. 11 is a diagram illustrating another exemplary game screen displayed on a monitor 2 in the embodiment.

Hereinafter, a specific exemplary game which is performed using the game system 1 will be described. FIGS. 10 and 11 are diagrams illustrating exemplary game screens displayed on the monitor 2 in this embodiment. As illustrated in FIGS. 10 and 11, the monitor 2 displays a virtual three-dimensional game space. In the game space, an object 51 mimicking a log (hereinafter referred to as a log object 51), and an object 52 mimicking a sword (hereinafter referred to as a sword object 52) are disposed. A player uses the controller 7 to operate the sword object 52 so as to play with the sword object 52, cutting the log object 51 (see FIG. 11).

The sword object 52 is operated by an operation of swinging the controller 7 in an arbitrary direction. Specifically, the player performs an operation of swinging the controller 7 in an arbitrary direction (swing operation) so as to operate the sword object 52. Note that, in this game, the player holds the controller in a manner which causes the longitudinal direction of the controller 7 to be substantially perpendicular to the swing direction of the controller 7. The player may hold the controller 7 in a manner which causes the upper surface of the controller 7 to point in any of upward, downward, leftward and rightward directions. In other words, the controller 7 is held in an arbitrary attitude with respect to a rotational direction about the z-axis.

When the player performs the swing operation using the controller 7, the game apparatus 3 initially calculates a swing direction of the controller 7. In this embodiment, the game apparatus 3 calculates a swing direction with respect to a gravity direction with respect to the x axis and the y axis in the xyz coordinate system (see FIG. 3) using the controller 7 as a reference. In this embodiment, even when the controller 7 is held in any rotational direction about the z axis, a movement direction (swing direction) of the controller 7 with respect to the gravity direction can be calculated, which will be described in detail below. Note that, in other embodiments, a swing direction with respect to the gravity direction may be calculated with respect to the three axes, i.e., the x axis, the y axis, and the z axis.

After the swing direction is calculated, the game apparatus 3 moves the sword object 52 on the screen in a direction corresponding to the swing direction. For example, when the player swings the controller 7 from left to right, the sword object 52 is moved from left to right on the screen (see FIG. 11). When the player swings the controller 7 from bottom to top, the sword object 52 is moved from bottom to top on the screen.

When the sword object 52 is moved, the game apparatus 3 determines whether or not the sword object 52 has contacted the log object 51. When the sword object 52 has contacted the log object 51, the log object 51 is cut along a track of the sword object 52 and is displayed as illustrated in FIG. 11. Thus, since the sword object 52 is moved in a manner corresponding to the swing direction of the controller 7, the player can have a sensation as if the player swung the sword object 52, by swinging the controller 7 in a desired direction. In addition, it is a novel game operation to perform a game operation by swinging the controller 7.

Figure 12:
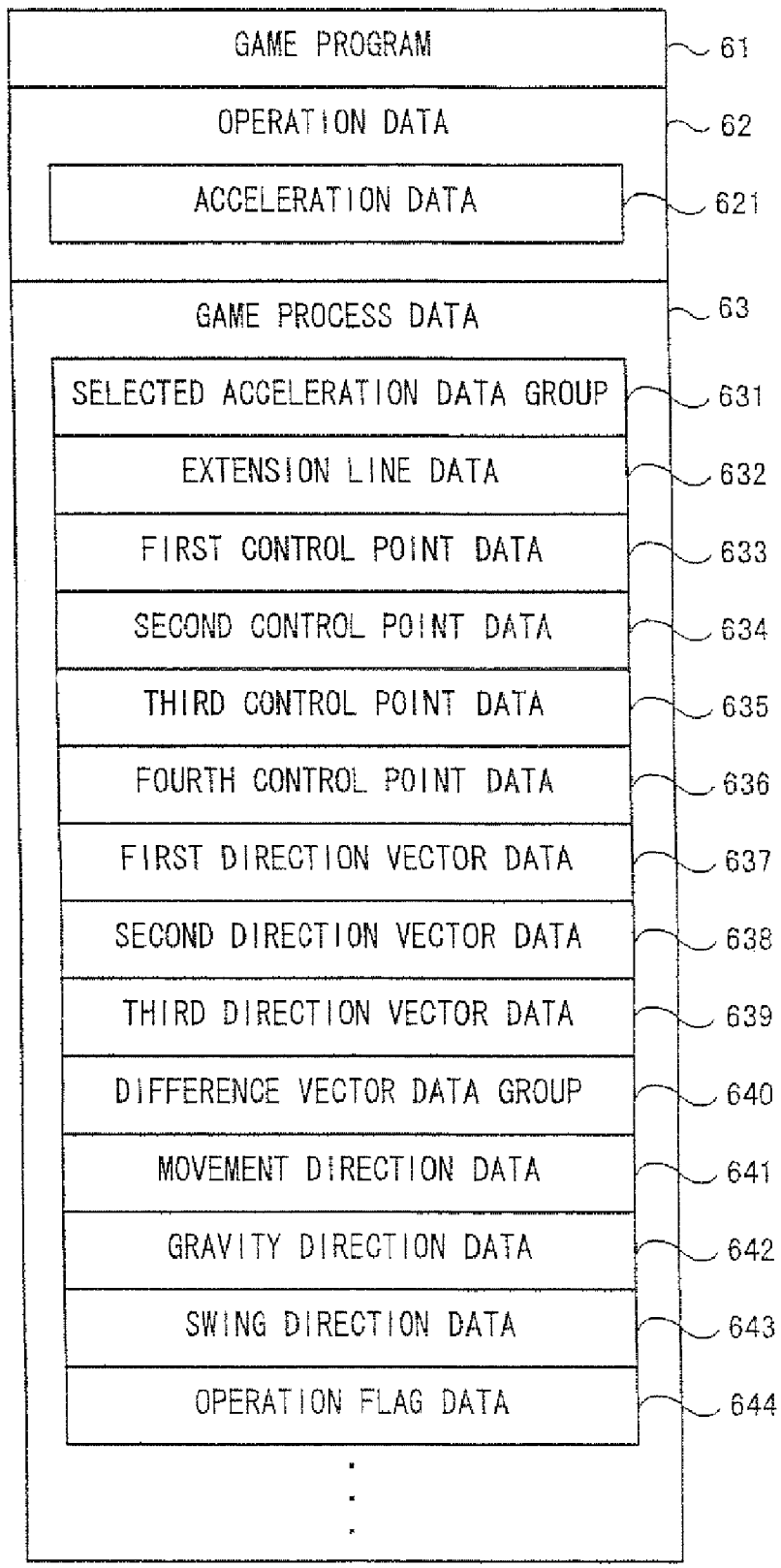
FIG. 12 is a diagram illustrating main data which is stored in a main memory 13 of the game apparatus 3.

Next, a program process which is executed by the game apparatus 3 in this embodiment will be described. Firstly, data which is mainly used in the game process will be described with reference to FIG. 12. FIG. 12 is a diagram illustrating main data which is stored in a main memory 13 of the game apparatus 3. As illustrated in FIG. 12, the main memory 13 stores a game program 61, operation data 62, game process data 63, and the like. Note that the main memory 13 also stores data required for the game process, such as image data of an object which appears in a game, in addition to the data of FIG. 12.

The whole or a part of the game program 61 is read out from the optical disc 4 into the main memory 13 with appropriate timing after the game apparatus 3 is powered ON. The game program 61 includes a program required for execution of the game process described below.

The operation data 62 is transmitted from the controller 7 to the game apparatus 3, and is stored into the main memory 13. The operation data 62 includes acceleration data 621. In this embodiment, the acceleration data 621 indicates acceleration values with respect to the three axes, i.e., the x axis, the y axis, and the z axis. Note that the operation data 62 may include data indicating positions of objects whose images to be captured (the markers 8a and 8b) in a captured image, and data indicating the contents of an operation performed with respect to each button of the operation section 32, in addition to the acceleration data 621.

The game process data 63 is data which is used in the game process described below. The game process data 63 includes a selected acceleration data group 631, extension line data 632, first to fourth control point data 633 to 636, first to third direction vector data 637 to 639, a difference vector data group 640, movement direction data 641, gravity direction data 642, swing direction data 643, and operation flag data 644.

The selected acceleration data group 631 is a set of acceleration data selected from acceleration data which is successively obtained from the controller 7, in accordance with a predetermined criterion. The predetermined criterion is that acceleration data is obtained during a movement period, of the acceleration data successively obtained from the controller 7. The movement period is a period during which the controller 7 is determined to be moved. Specifically, the movement period is a period from a time when it is determined that the controller 7 is started to be moved (start time) to a time when it is determined that the motion of the controller 7 is ended (end time). The movement period is detected using a z-axis direction acceleration detected by the acceleration sensor 37, though specifically described below. Note that only a piece of acceleration data may be included in the selected acceleration data group 631.

Figure 13:
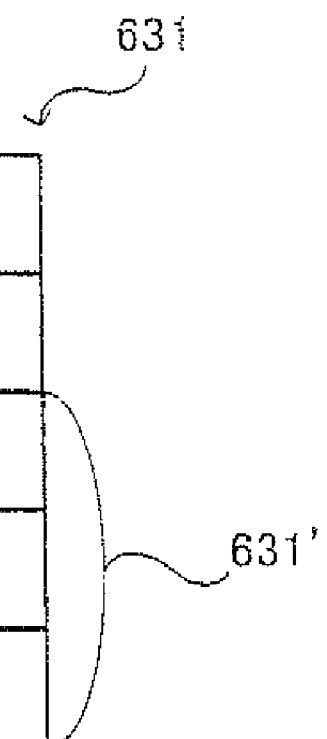
FIG. 13 is a diagram illustrating an exemplary selected acceleration data group 631.

FIG. 13 is a diagram illustrating an example of the selected acceleration data group 631. In FIG. 13, one block indicates one piece of acceleration data, and blocks are arranged in order in which acceleration data was obtained, with the earliest at the top. Hereinafter, of the acceleration data included in the selected acceleration data group 631, an acceleration vector indicated by i-th (i is an integer of 1 or more) obtained acceleration data is represented by "$VA_i$".

As illustrated in FIG. 13, each piece of acceleration data stored as the selected acceleration data group 631 in the main memory indicates a two-dimensional acceleration vector having acceleration values with respect to the x axis and y axis of the xyz coordinate system as components thereof. Specifically, when acceleration data obtained from the controller 7 is stored as the selected acceleration data group 631 into the main memory 13, an acceleration value with respect to the z axis of acceleration values with respect to the three axes indicated by the acceleration data is not stored, and only data indicating the remaining x- and y-axis acceleration values are stored. Note that a reason why acceleration data included in the selected acceleration data group 631 is data indicating a two-dimensional acceleration vector, is that this embodiment is aimed to calculate a swing direction with respect to the x axis and the y axis, and the z-axis acceleration value is not used in the calculation process of a swing direction. In other words, in this embodiment, the game apparatus 3 calculates a swing direction of the controller 7 using the two-dimensional acceleration vector.

The acceleration sensor 37 has a limitation on the value of a detectable acceleration, and outputs a limit value with respect to an acceleration exceeding the limit. Therefore, the selected acceleration data group 631 may include acceleration data which indicates an acceleration vector having components any of which has the limit value (=±2.2) of the detectable range of the acceleration sensor 37. Hereinafter, such acceleration data is referred to as "limit acceleration data". Of the selected acceleration data group 631, acceleration data which is not limit acceleration data is referred to as "non-limit acceleration data". In FIG. 13, the third to fifth acceleration vectors $VA_3$ to $VA_5$ have an x component which is a limit value of "−2.2". Therefore, the third to fifth acceleration data constitute a limit acceleration data group 631'. In the limit acceleration data group 631', an acceleration value is corrected by a data correcting process (step S22) described below. In the data correcting process, one having the limit value of the components of a two-dimensional acceleration vector indicated by limit acceleration data is corrected, though described in detail below.

Referring back to FIG. 12, the extension line data 632 is data which indicates an extension line which is used for correction of the limit acceleration data group 631'. In this embodiment, a third-order Bezier curve is used as an extension line. The Bezier curve is defined by:

$$p = P0 \times (1-u)^3 + P1 \times 3u(1-u)^2 + P2 \times 3u^2(1-u) + P3u^3 \qquad (1)$$

where p represents a variable indicating coordinate values in the xy coordinate system composed of the x axis and the y axis, as is similar to the two-dimensional acceleration vector, u represents a variable which has a scalar value within the range of $0 \leq u \leq 1$, and P0, P1, P2, and P3 represent constants indicating control points. By determining the values of these four control points, the shape of the Bezier curve is determined.

The first to fourth control point data 633 to 636 are data indicating the values of the four control points of the Bezier curve. Specifically, the first control point data 633 indicates the control point P0, the second control point data 634 indicates the control point P1, the third control point data 635 indicates the control point P2, and the fourth control point data 636 indicates the control point P3. The first to fourth control points P0 to P3 are represented by coordinate values in the xy coordinate system composed of the x axis and the y axis.

The first to third direction vector data 637 to 639 indicate three vectors which are used for determination of the four control points P0 to P3. Specifically, the first direction vector data 637 indicates a first direction vector V1, the second direction vector data 638 indicates a second direction vector V2, and the third direction vector data 639 indicates a third direction vector V3. The first to third direction vectors are represented by the xy coordinate system, as is similar to the two-dimensional acceleration vector. A method of calculating the first to third direction vectors will be described below.

The difference vector data group 640 indicates a set of difference vector data calculated from acceleration data included in the selected acceleration data group 631. The difference vector data indicates a vector of a difference between an acceleration vector indicated by acceleration data and an acceleration vector indicated by the next obtained acceleration data, for each piece of acceleration data included in the selected acceleration data group 631. The difference vector data group 640 is used for calculation of a movement direction vector described below.

The movement direction data 641 indicates a movement direction of the controller 7 which is represented using an orientation of the controller 7 as a reference. The movement direction is represented by a vector in the xy coordinate system. Hereinafter, the vector indicating the movement direction is referred to as a movement direction vector. The movement direction vector is calculated using the difference vector data group 640.

The gravity direction data 642 indicates a direction of gravity applied to the controller 7 using the orientation of the controller 7 as a reference. The gravity direction is represented by a vector in the xy coordinate system. Hereinafter, the vector indicating the gravity direction is referred to as a gravity direction vector. The gravity direction vector is calculated using the selected acceleration data group 631.

The swing direction data 643 indicates a direction (swing direction) in which the controller 7 is swung with respect to the gravity direction. The swing direction is represented in a vector in an XY coordinate system (see FIG. 21) for indicating a direction, using the gravity direction as a reference. Hereinafter, the vector indicating the swing direction is referred to as a swing direction vector. The swing direction vector is calculated using the movement direction vector and the gravity direction vector. In this embodiment, the game process is executed directly based on the swing direction vector. Specifically, the game apparatus 3 moves the sword object 52 in a direction corresponding to the swing direction vector in the game space.

The operation flag data 644 is data of an operation flag indicating whether or not the player is in the middle of a swing operation. The operation flag is set to be ON when a swing operation is being performed, and OFF when a swing operation is not being performed.

Figure 14:
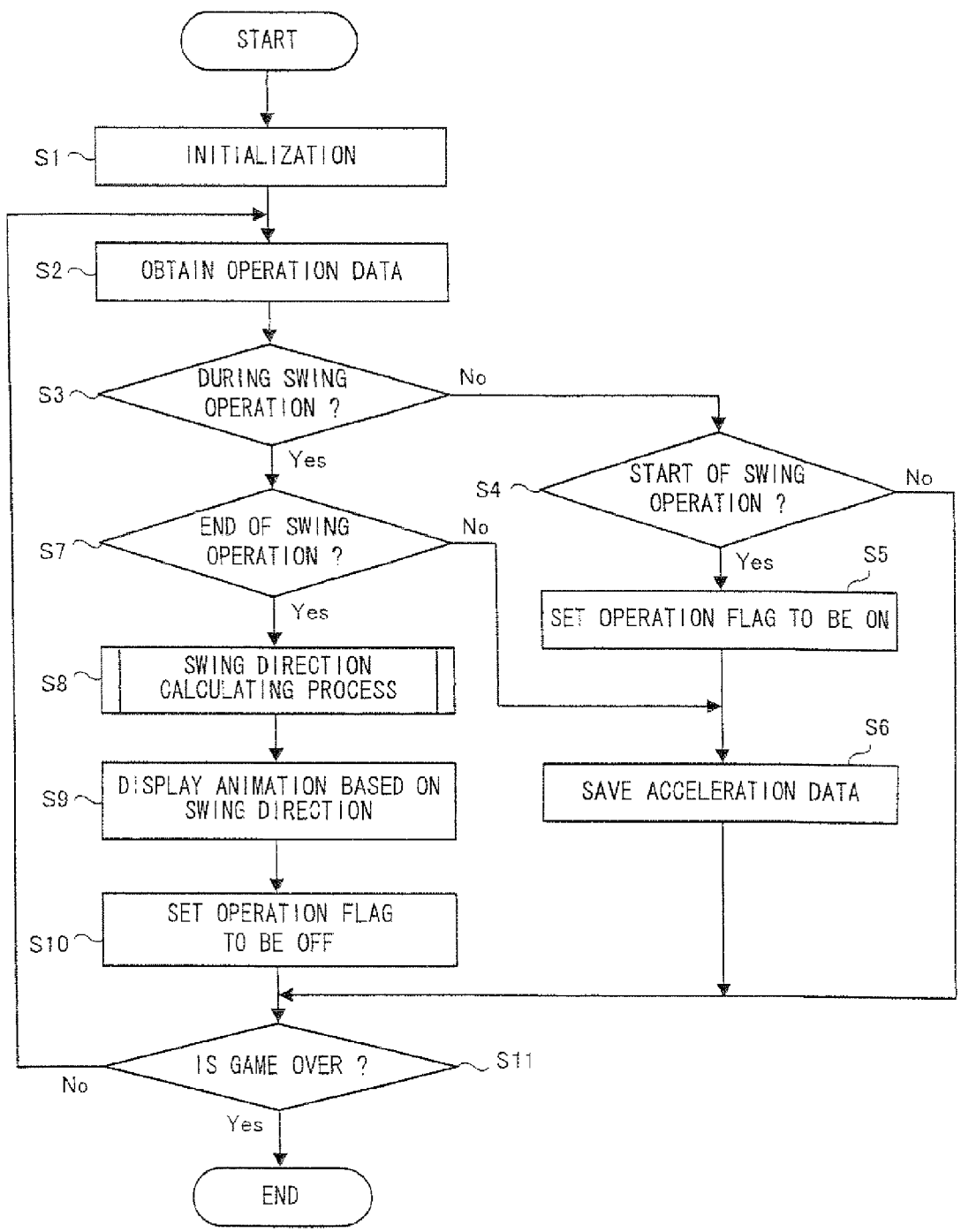
FIG. 14 is a main flowchart illustrating a flow of a process executed in the game apparatus 3.

Next, a process performed in the game apparatus 3 will be described in detail with reference to FIGS. 14 to 18. FIG. 14 is a main flowchart illustrating a flow of the process executed in the game apparatus 3. When the game apparatus 3 is powered ON, the CPU 10 of the game apparatus 3 executes a boot program stored in a boot ROM (not shown), thereby initializing each unit, such as the main memory 13 and the like. Thereafter, a game program stored on the optical disc 4 is read into the main memory 13, and the CPU 10 starts execution of the game program. The flowchart of FIG. 14 illustrates a process which is performed after the above-described process.

Initially, in step S1, data which is to be used in the subsequent process is initialized. Specifically, the CPU 10 clears the data 631 to 643 included in the game process data 63 of the main memory 13. Also, data indicating OFF is set in the operation flag data 644. Note that, at this time, the log object 51 is provided in the virtual three-dimensional space. After execution of step S1, a process loop of steps S2 to S11 is repeatedly performed so as to cause a game to proceed.

In step S2, the CPU 10 obtains operation data from the controller 7. Specifically, the controller 7 transmits operation data to the game apparatus 3 at predetermined time intervals (e.g., within a one-frame time interval), and the CPU 10 stores the transmitted operation data into the main memory 13. The operation data includes at least the acceleration data. The CPU 10 stores the acceleration data into the main memory 13. Note that, when the acceleration data 621 is already stored in the main memory 13, the contents of the acceleration data 621 are updated to store the contents of the acceleration data. In this embodiment, the process of step S2 is executed for each one-frame time, except for during the processes of steps S8 to S10, so that the game apparatus 3 can successively obtain acceleration data.

Next, in step S3, the CPU 10 determines whether or not the player is in the middle of an operation of swinging the controller 7. The determination of step S3 is performed with reference to the operation flag data 644 stored in the main memory 13. Specifically, when the operation flag is ON, it is determined that the player is in the middle of an operation of swinging the controller 7. When the operation flag is OFF, it is determined that the player is not in the middle of an operation of swinging the controller 7. When the determination result of step S3 is negative, the process of step S4 is executed. On the other hand, the determination result of step S3 is positive, the process of step S7 described below is executed.

In step S4, the CPU 10 determines whether or not a swing operation has been started. The determination of step S4 is performed based on the acceleration data 621 stored in the main memory 13. Specifically, when an acceleration value with respect to the z axis indicated by the acceleration data 621 is larger than a predetermined first threshold, it is determined that a swing operation has been started. When the z-axis acceleration value is smaller than or equal to the first threshold, it is determined that a swing operation has not been started.

Here, when a swing operation is being performed, a centrifugal force is applied to the controller 7 in the z-axis direction as illustrated in FIG. 8. Therefore, when the swing operation is performed with some speed, the z-axis acceleration value is larger than the first threshold. Therefore, as indicated in step S4, it can be easily determined whether or not a swing operation is being performed, by referencing the z-axis acceleration value and determining whether or not the acceleration value is larger than a predetermined value (first threshold).

When the determination result of step S4 is positive, processes of steps S5 and S6 are executed. On the other hand, when the determination result of step S4 is negative, the processes of steps S5 and S6 are skipped and a process of step S11 described below is executed.

In step S5, the operation flag is set to be ON. Specifically, the CPU 10 rewrites the contents of the operation flag data 644 stored in the main memory 13 into data indicating ON. Thereby, when the loop process of steps S2 to S11 is next performed, the determination result of step S3 becomes positive.

Next, in step S6, the CPU 10 saves the acceleration data obtained in step S2 as the selected acceleration data group 631. Specifically, the acceleration data 621 stored in the main memory is added to the acceleration data stored in the selected acceleration data group 631. Note that, as described above, in this embodiment, of the acceleration values with respect to the three axes which are indicated by the acceleration data 621, the acceleration value with respect to the z-axis is not stored, and data indicating only the acceleration values of the remaining x and y axes is stored. In other words, as illustrated in FIG. 13, data indicating a two-dimensional acceleration vector is stored. After step S6, the process of step S11 described below is executed.

On the other hand, in step S7, the CPU 10 determines whether or not the swing operation has been ended. The determination in step S7 is performed based on the acceleration data 621 stored in the main memory 13. Specifically, when the acceleration value with respect to the z axis which is indicated by the acceleration data is smaller than or equal to a predetermined second threshold, it is determined that the swing operation has been ended, and when the acceleration value with respect to the z axis is larger than the second threshold, it is determined that the swing operation has not been ended. Note that, when a swing operation is not being performed, a centrifugal force is not applied to the controller 7 with respect to the z-axis direction as illustrated in FIG. 7, the acceleration value with respect to the z axis is smaller than or equal to the second threshold. Therefore, as described above, by referencing an acceleration value with respect to the z axis and determining whether or not the acceleration value is smaller than or equal to a predetermined value (second threshold), it is possible to easily determine whether or not a swing operation is being performed. Note that the first and second thresholds may have the same values or different values. In this embodiment, for example, both the first and second thresholds are assumed to be "1.1". When the determination result of step S7 is positive, processes of steps S8 to S10 described below are executed. On the other hand, when the determination result of step S7 is negative, the above-described process of step S6 is executed.

Figure 15:
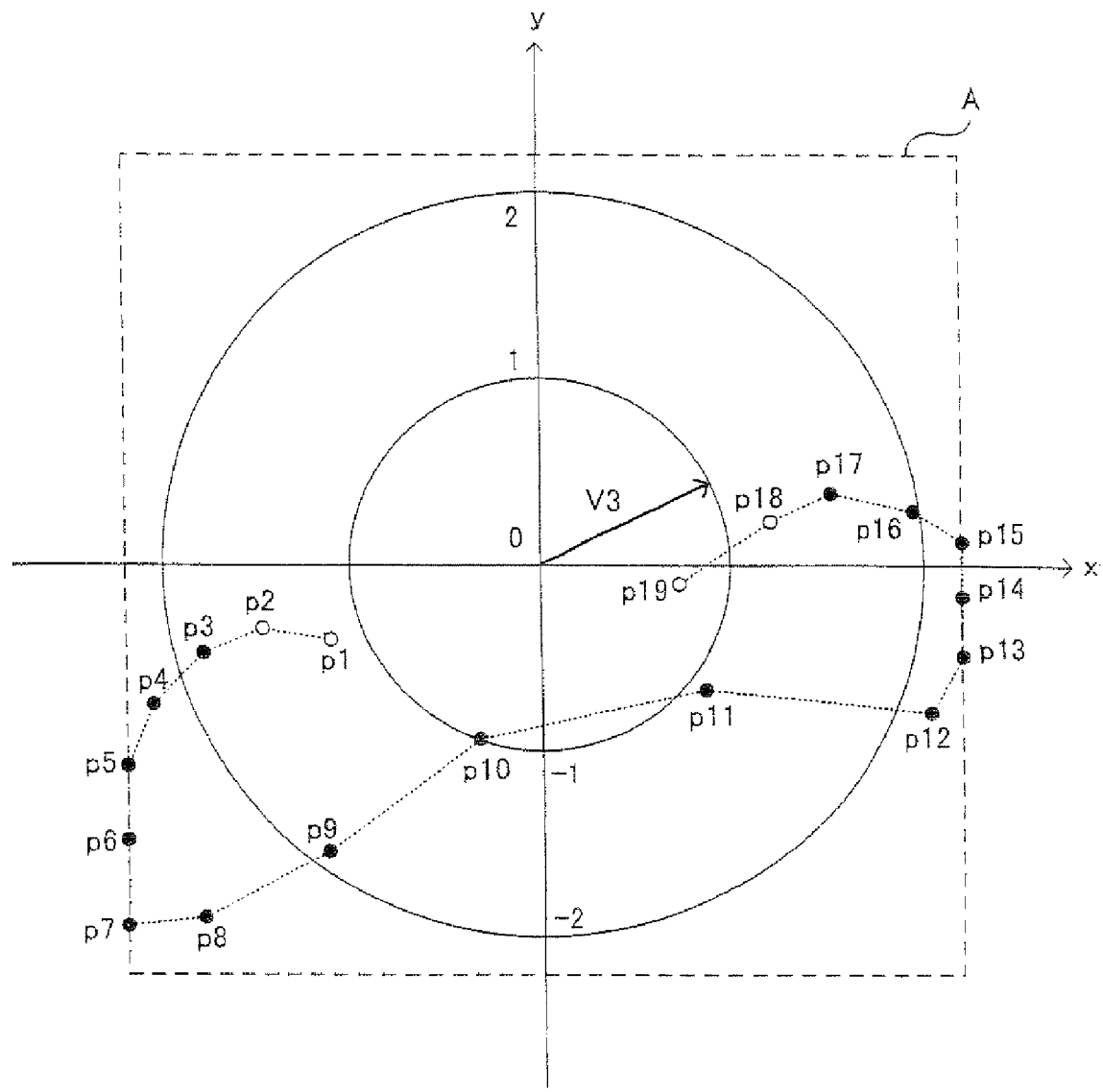
FIG. 15 is a diagram illustrating transition of acceleration data obtained in step S2 for some period.

FIG. 15 is a diagram illustrating transition of acceleration data stored in step S2 for some period. In FIG. 15, an acceleration vector indicated by the obtained acceleration data is represented by coordinates in a two-dimensional coordinate system composed of an x coordinate and a y coordinate. In FIG. 15, points p1 to p19 indicate the final points of respective acceleration vectors, and the initial point of each acceleration vector is positioned at the origin. For example, an acceleration vector indicated by the point p1 is a vector having an initial point at the origin and a final point at the point p1. In FIG. 15, 19 acceleration vectors are indicated by the points p1, p2, p3, ..., and p19 in order in which the vectors were obtained. Note that, in FIG. 15, a point indicated by an open circle indicates an acceleration vector when an acceleration value with respect to the z axis which is indicated by acceleration data corresponding to the acceleration vector, is smaller than or equal to the first threshold (second threshold). In FIG. 15, a point indicated by a closed circle indicates an acceleration vector when an acceleration value with respect to the z axis which is indicated by acceleration data corresponding to the acceleration vector, is larger than the first threshold (second threshold).

When a swing operation has not been started immediately after the start of a game (including the case where the controller 7 is not swung with sufficient speed), acceleration data whose acceleration value with respect to the z axis is smaller than or equal to the first threshold, as indicated by the points p1 and p2 (open circles), is obtained in step S2. In this case, since the determination results of steps S3 and S4 are both negative, acceleration data is not saved. Thereafter, when a swing operation is started and the controller 7 is swung with some speed, acceleration data whose acceleration value with respect to the z axis is larger than the first threshold, as indicated by the point p3 (closed circle), is obtained in step S2. In this case, the determination result of step S3 is negative and the determination result of step S4 is positive. Thereby, the game apparatus 3 detects a time point when the swing operation is started, i.e., the start time of the movement period. Saving of the acceleration data is started from the time point when the swing operation is started (step S6). In the example of FIG. 15, an acceleration vector corresponding to the point p3 is stored in the main memory 13.

During the time when the swing operation is continued, acceleration data whose acceleration value with respect to the z axis is larger than the first threshold, as indicated by the points p4 to p17 (closed circles), is obtained in step S2. In this case, the determination result of step S3 is positive and the determination result of step S7 is negative, so that saving of acceleration data is continued (step S6). Therefore, following the point p3, acceleration vectors corresponding to the points p4 to p17 are successively stored into the main memory 13.

When the speed of the controller 7 is decreased so that the swing operation is ended, acceleration data whose acceleration value with respect to the z axis is smaller than or equal to the first threshold, as indicated by the point p18 (open circle), is obtained in step S2. In this case, the determination result of step S3 is positive and the determination result of step S7 is positive. Thereby, the game apparatus 3 detects a time point when the swing operation is ended, i.e., the end time of the movement period. Thereafter, saving of the acceleration data is ended at the time point when the swing operation is ended, and the processes of steps S8 to S10 are executed. As described above, data of acceleration vectors indicated by acceleration data obtained during a movement period is stored as the selected acceleration data group 631 into the main memory 13. In the example of FIG. 15, data of the acceleration vectors corresponding to the points p3 to p17 is stored into the main memory 13.

The processes of steps S8 to S10 are executed immediately after the end of a swing operation. In the processes of steps S8 to S10, a swing direction of the controller 7 in a swing operation is calculated (step S8), and a game process is executed based on the calculated swing direction (step S9). Hereinafter, the processes of steps S8 to S10 will be described in detail.

Initially, in step S8, a swing direction calculating process is executed. The swing direction calculating process is a process for calculating a swing direction of the controller 7 in a swing operation immediately previously performed. Hereinafter, the swing direction calculating process will be described in detail with reference to FIG. 16.

Figure 16:
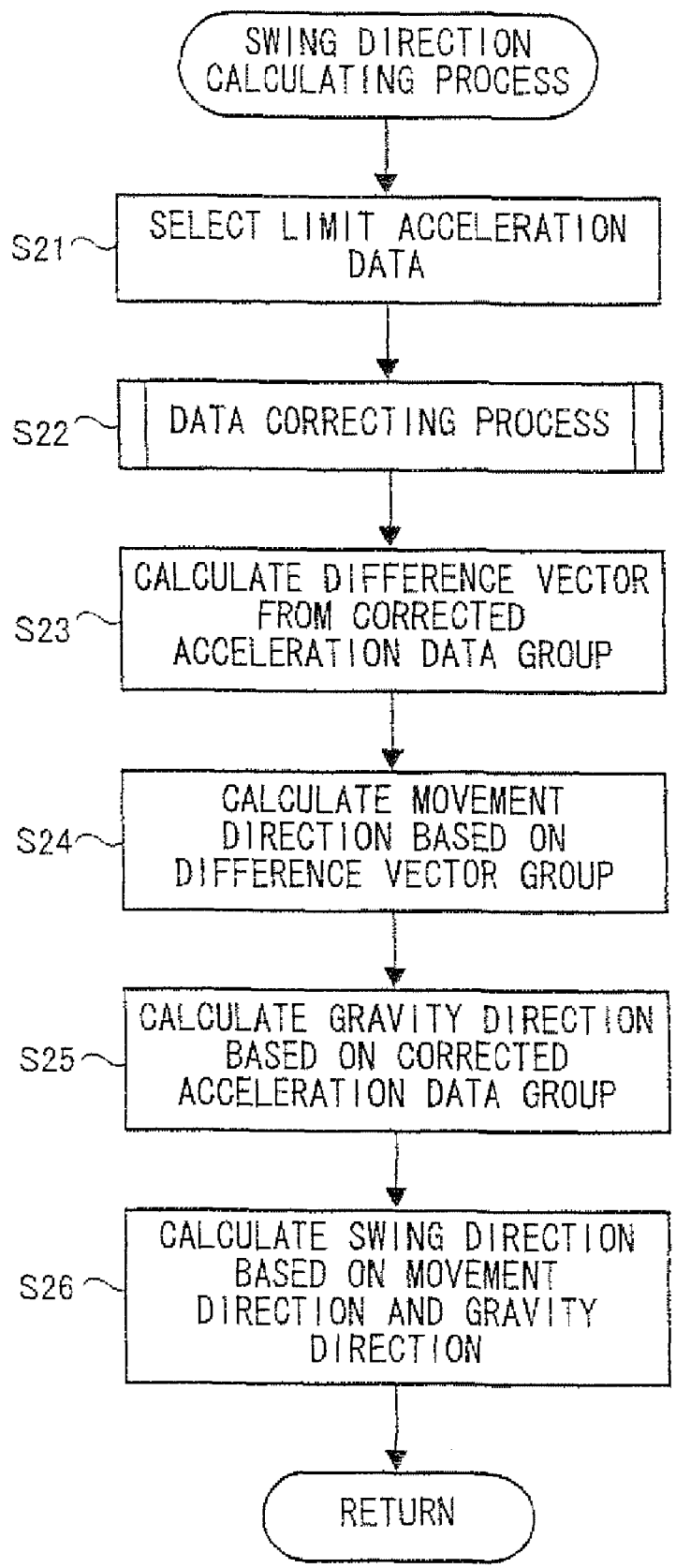
FIG. 16 is a flowchart illustrating a detail of a swing direction calculating process (step S8) of FIG. 14.

FIG. 16 is a flowchart illustrating a detail of the swing direction calculating process (step S8) of FIG. 14. In the swing direction calculating process, initially, in step S21, the CPU 10 selects limit acceleration data from the selected acceleration data group 631. As described above, the limit acceleration data refers to acceleration data in which any one of the components of an acceleration vector takes a limit value of the detectable range of the acceleration sensor 37. In the example of FIG. 15, the points p5, p6, p7, p13, p14, and p15 correspond to limit acceleration data. Note that an area A enclosed with a dashed line of FIG. 15 indicates a range within which acceleration data can be detected ($-2.2 \leq x \leq 2.2$ and $-2.2 \leq y \leq 2.2$).

Note that, in the above-described step S21, a set of a plurality of pieces of limit acceleration data successively obtained, is selected as a single limit acceleration data group 631'. Therefore, when there are two sets of successively obtained pieces of limit acceleration data of the selected acceleration data group 631, the two limit acceleration data groups 631' are handled as separate sets. In the example of FIG. 15, a limit acceleration data set corresponding to the points p5, p6 and p7 is selected as a single limit acceleration data group 631', and a limit acceleration data set corresponding to points p13, p14 and p15 is selected as another single limit acceleration data group 631'.

In step S22, a data correcting process is executed. The data correcting process refers to a process of correcting a value of each piece of limit acceleration data included in the limit acceleration data group 631'. Hereinafter, the data correcting process will be described in detail with reference to FIG. 17.

Figure 17:
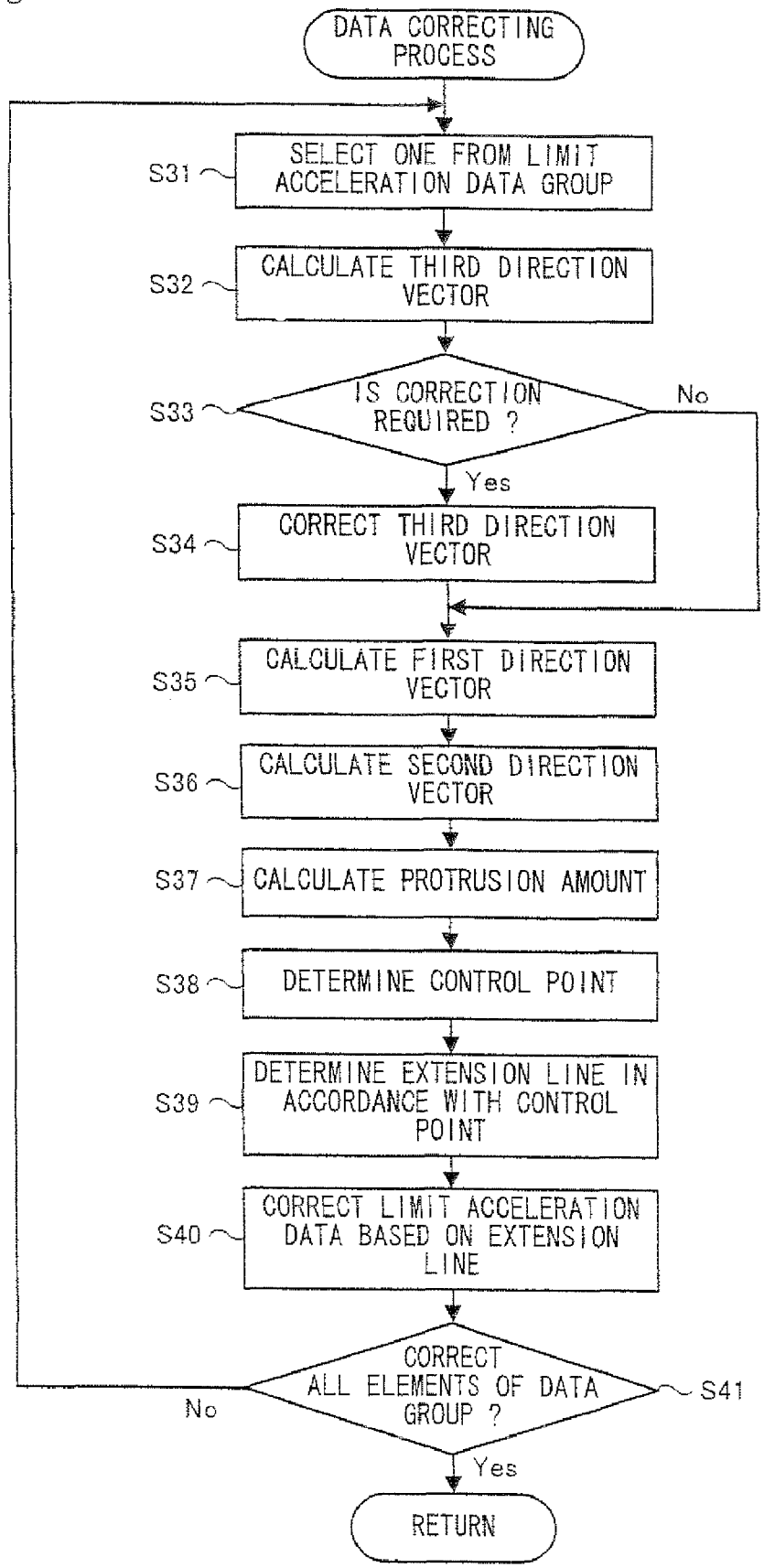
FIG. 17 is a flowchart illustrating a detail of a data correcting process (step S22) of FIG. 16.

FIG. 17 is a flowchart illustrating a detail of the data correcting process (step S22) of FIG. 16. In the data correcting process, initially, in step S31, the CPU 10 selects one of limit acceleration data groups 631' stored in the main memory 13. This is because, as described above, in step S21, a plurality of limit acceleration data groups 631' may be selected. In processes of steps S32 to S40 described below, correction is performed with respect to the limit acceleration data group 631' selected in step S31.

Next, in step S32, the CPU 10 calculates a third direction vector for determining a control point of an extension line. The third direction vector is, for example, a vector V3 illustrated in FIG. 15, which is calculated based on the selected acceleration data group 631 stored in the main memory 13. Specifically, the third direction vector V3 is calculated by:

$$V3 = \sum_{t=1}^{k} |VA_{t+1} - VA_t|(VA_{t+1} - VA_t) \quad (2)$$

where $VA_t$ represents a vector indicating a t-th acceleration included in a selected acceleration data group, and k represents a variable indicating the number of acceleration vectors included in the selected acceleration data group 631. As can be clearly seen from expression (2), the third direction vector V3 is calculated by: (a) calculating a difference vector ($VA_{t+1} - VA_t$) between an acceleration vector ($VA_t$) corresponding to acceleration data and an acceleration vector ($VA_{t+1}$) corresponding to one obtained next to the acceleration data for each piece of acceleration data included in the selected acceleration data group 631; and (b) calculating a sum of the difference vectors while assigning a weight to each difference vector depending on the magnitude of the difference vector ($|VA_{t+1} - VA_t|$).

Data indicating the third direction vector V3 thus calculated is stored as the third direction vector data 639 into the main memory 13. Note that, in expression (2), the third direction vector V3 is calculated using all pieces of acceleration data stored in the selected acceleration data group 631. Alternatively, in other embodiments, the third direction vector may be calculated using only the non-limit acceleration data of the selected acceleration data group 631.

Next, in step S33, the CPU 10 determines whether or not the direction of the third direction vector needs to be corrected. The determination of step S33 is performed based on the third direction vector, an immediately previous acceleration vector, and an immediately next acceleration vector. As used herein, the immediately previous acceleration vector refers to an acceleration vector indicated by acceleration data obtained immediately before limit acceleration data (the limit acceleration data group selected in step S21), of non-limit acceleration data. The immediately next acceleration vector refers to an acceleration vector indicated by acceleration data obtained immediately after limit acceleration data (the limit acceleration data group selected in step S21), of non-limit acceleration data. For example, in the example of FIG. 15, when the limit acceleration data group indicated by the points p5 to point p7 is selected, acceleration data corresponding to the point p4 obtained immediately before the point p5 is immediately previous acceleration data, and acceleration data corresponding to the point p8 immediately after the point p7 is immediately next acceleration data.

Specifically, the determination of step S33 is performed by calculating an inner product of a vector obtained by adding the immediately previous acceleration vector and the immediately next acceleration, and the third direction vector. Specifically, when the inner product value is negative, it is determined that the direction of the third direction vector needs to be corrected, and when the inner product value is not negative, it is determined that the direction of the third direction vector does not need to be corrected. When the determination result of step S33 is positive, a process of step S34 is executed. On the other hand, when the determination result of step S33 is negative, the process of step S34 is skipped, and a process of step S35 is executed.

In step S34, the third direction vector calculated in step S32 is corrected. Specifically, the CPU 10 corrects the third direction vector so that the direction of the third direction vector is reversed. In this case, the contents of the third direction vector data 639 stored in the main memory 13 are rewritten into data indicating the corrected contents. After step S34, the process of step S35 is executed.

In step S35, the CPU 10 calculates the first direction vector V1 for determining a control point of an extension line. In this embodiment, the first direction vector is calculated based on the immediately previous acceleration data, and first preceding non-limit acceleration data obtained with respect to the immediately previous acceleration data. Note that these pieces of acceleration data are stored in the selected acceleration data group 631 stored in the main memory 13. Specifically, the first direction vector V1 is calculated by:

$$V1 = VA_N - VA_{N-1} \quad (3)$$

where $VA_N$ represents an acceleration vector indicated by immediately previous acceleration data and $VA_{N-1}$ represents an acceleration vector indicated by the first preceding non-limit acceleration data obtained with respect to the immediately previous acceleration data. As can be seen from expression (3), the first direction vector is calculated as a vector obtained by subtracting an acceleration vector indicated by the first preceding non-limit acceleration data obtained with respect to the immediately previous acceleration data, from an acceleration vector indicated by the immediately previous acceleration data. Therefore, in the example FIG. 15, the first direction vector V1 is a vector having the point p3 as the initial point and the point p4 as the final point. Data indicating the first direction vector thus calculated is stored as the first direction vector data 637 in the main memory 13.

Note that, in other embodiments, the first direction vector V1 may be calculated based on immediately previous acceleration data, and one or more pieces of acceleration data obtained before the immediately previous acceleration data. For example, the first direction vector V1 may be calculated based on immediately previous acceleration data, and first and second preceding acceleration data obtained with respect to the immediately previous acceleration data. In this case, the CPU 10 calculates an approximate straight line with respect to the final points of three acceleration vectors corresponding to the three pieces of acceleration data, and a vector indicating the slope of the approximate straight line is assumed to be the first direction vector.

In step S36, the CPU 10 calculates the second direction vector V2 for determining a control point of an extension line. In this embodiment, the second direction vector is calculated based on immediately next acceleration data, and first succeeding non-limit acceleration data obtained with respect to the immediately next acceleration data. Note that these pieces of acceleration data are included in the selected acceleration data group 631 stored in the main memory 13. Specifically, the second direction vector V2 is calculated by:

$$V2 = VA_Q - VA_{Q+1} \quad (4)$$

where $VA_Q$ represents an acceleration vector indicated by immediately next acceleration data, and $VA_{Q+1}$ represents an acceleration vector indicated by the first succeeding non-limit acceleration data obtained with respect to the immediately next acceleration data. As can be seen from expression (4), the second direction vector is calculated by subtracting the acceleration vector indicated by the first succeeding non-limit acceleration data obtained with respect to the immediately next acceleration data, from the acceleration vector indicated by the immediately next acceleration data. Therefore, in the example of FIG. 15, the second direction vector V2 is a vector having the point p9 as the initial point and the point p8 as the final point. Data indicating the second direction vector thus calculated is stored as the second direction vector data 638 into the main memory 13. Note that, in other embodiments, the second direction vector V2 may be calculated based on immediately next acceleration data, and one or more pieces of acceleration data obtained after the immediately next acceleration data, as in the case of the first direction vector.

In step S37, the CPU 10 calculates a protrusion amount n for determining a control point of an extension line. The protrusion amount n is calculated based on the limit acceleration data group 631' included in the selected acceleration data group 631 stored in the main memory 13. Specifically, the protrusion amount n is set to be the number of pieces of limit acceleration data included in the limit acceleration data group 631' selected in step S31. Note that the protrusion amount n has an influence on the shape of the extension line, though described in detail below. Specifically, the degree of protrusion of the extension line increases with an increase in the value of the protrusion amount n.

Figure 18:
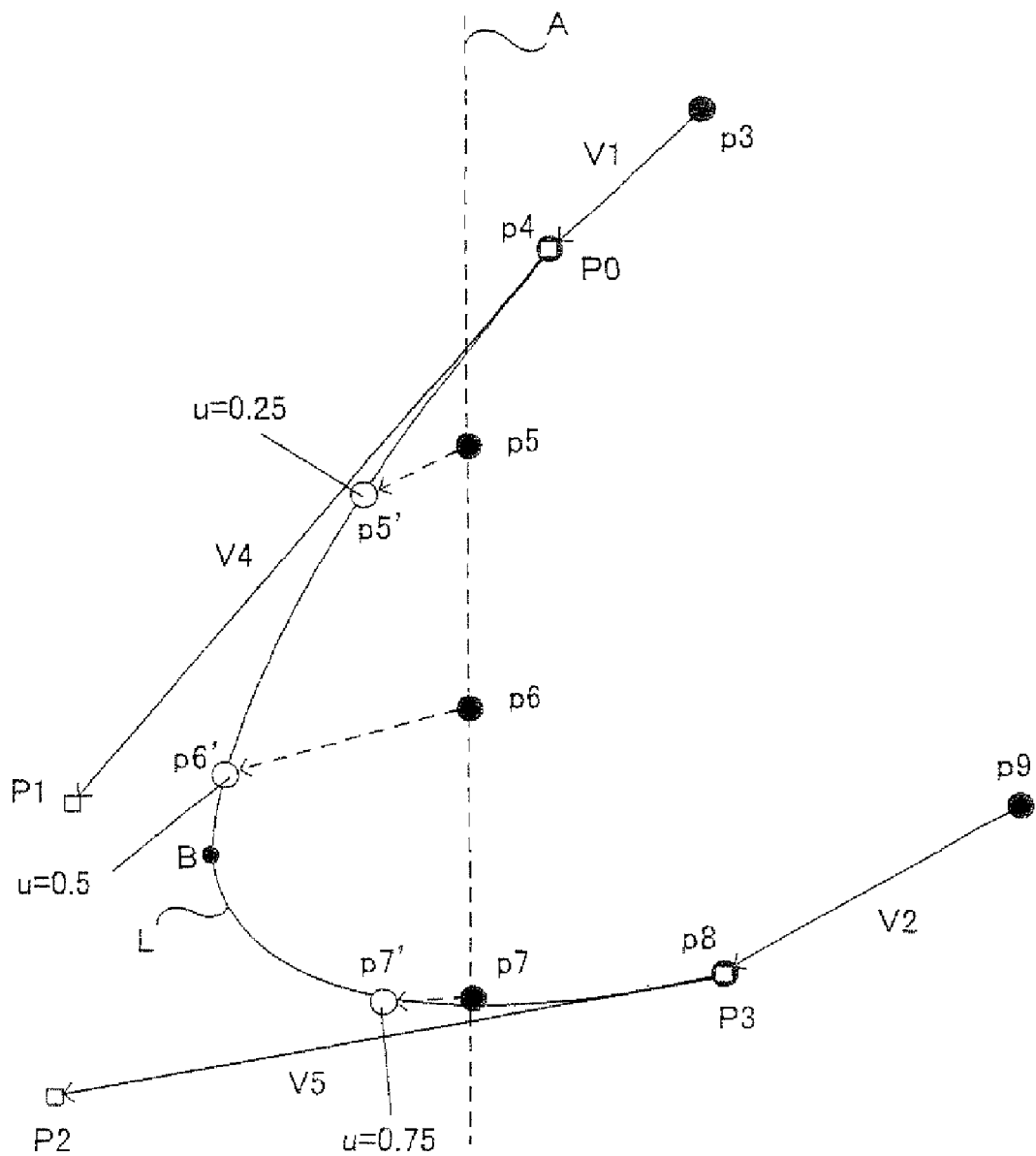
FIG. 18 is a diagram illustrating exemplary determined control points and extension line.

Next, in step S38, the CPU 10 determines control points P0 to P3 of an extension line. FIG. 18 is a diagram illustrating exemplary control points and extension line thus determined. In FIG. 18, of the area of the xy coordinate system, a portion including the points p3 to p9 of FIG. 15 is particularly indicated. As illustrated in FIG. 18, of the four control points of a Bezier curve, the first control point P0 (one end point) is determined at the position of the point p4 indicating an acceleration vector indicated by the immediately previous acceleration data. Data indicating the first control point P0 thus determined is stored as the first control point data 633 into the main memory 13. The fourth control point P3 (the other end point) is determined at the position of the point p8 indicating an acceleration vector indicated by the immediately next acceleration. Data indicating the fourth control point P3 thus determined is stored as the fourth control point data 636 into the main memory 13.

Also, of the four control points of the Bezier curve, the second control point P1 (one direction point) is determined based on the first direction vector V1, the third direction vector V3, the protrusion amount n, and the first control point P0. Specifically, the CPU 10 calculates the position of the second control point P1 by:

$$P1 = P0 + (V1 + V3 \times K0) \times n \times K1 \quad (5)$$

where K0 and K1 represent constants having scalar values which are previously determined to be appropriate values. Data indicating the second control point P1 thus calculated is stored as the second control point data 634 into the main memory 13. As illustrated in FIG. 18, the second control point P1 indicates a position obtained by shifting the position of the first control point P0 in the direction of a vector V4 of FIG. 18 by the length of the vector V4. Note that the vector V4 is a vector which has the first direction vector V1 and the third direction vector V3 as the components, and whose length depends on the protrusion amount n.

Also, of the four control points of the Bezier curve, the third control point P2 (the other direction point) is determined based on the second direction vector V2, the third direction vector V3, the protrusion amount n, and the fourth control point P3. Specifically, the CPU 10 calculates the position of the third control point P2 by:

$$P2 = P3 + (V2 + V3 \times K0) \times n \times K1 \quad (6).$$

Data indicating the third control point P2 thus calculated by expression (6) is stored as the third control point data 635 into the main memory 13. As illustrated in FIG. 18, the third control point P2 has a position obtained by shifting the position of the fourth control point P3 in the direction of a vector V5 of FIG. 18 by the length of the vector V5. Note that the vector V5 is a vector which has the second direction vector V2 and the third direction vector V3 as the components, and whose length depends on the protrusion amount n. In the above-described manner, the control points P0 to P3 for determining a Bezier curve (extension line) are determined.

Note that, in other embodiments, the vector V4 of FIG. 18 may be calculated based on only either the first direction vector V1 or the third direction vector V3. Also, the vector V5 of FIG. 18 may be calculated based on only either the second direction vector V2 or the third direction vector V3.

Next, in step S39, the CPU 10 determines an extension line based on the control point data 633 to 636 stored in the main memory 13. Specifically, by substituting the values of the control points P0 to P3 into expression (1), a function representing the Bezier curve (extension line) is determined. Data indicating the determined function is stored as the extension line data 632 into the main memory 13.

In the example of FIG. 18, the extension line determined by the control points P0 to P3 is as illustrated with a curve L. Specifically, the slope at the control point P0 of the extension line L is the slope of a line segment connecting between the control point P0 and the control point P1, and the slope at the control point P3 of the extension line L is the slope of a line segment connecting between the control point P3 and the control point P2. The length of the extension line L, and the distance from a point B on the extension line L most distant from the area A indicating the detectable range of the acceleration sensor 37, to the area A, increase with an increase in the distance from the control point P0 to the control point P1. Similarly, the length of the extension line L and the distance from the point B to the area A increase with an increase in the distance from the control point P3 to the control point P2.

Next, in step S40, the CPU 10 corrects the values of the limit acceleration data group 631' based on the extension line data 632 stored in the main memory 13. The values of the limit acceleration data are corrected so as to become values on the extension line. In other words, the CPU 10 corrects the xy coordinate values of the acceleration vectors indicated by the limit acceleration data so as to become coordinate values on the extension line. In this embodiment, the corrected coordinate values of the limit acceleration data are determined so that the extension line is equally divided by coordinate positions corresponding to the limit acceleration data. In the example of FIG. 18, points p5' to p7' obtained by correcting the points p5 to p7 corresponding to the limit acceleration data are determined to have positions which divide the extension line L into four equal portions. Specifically, in expression (1), a position indicated by the variable p when the variable u=0.25 is assumed to be a position of a point p5', a position indicated by the variable p when the variable u=0.5 is assumed to be a position of a point p6', and a position indicated by the variable p when the variable u=0.75 is assumed to be a position of a point p7'. Although all the corrected points p5' to p7' are positioned outside the area A in FIG. 18, the corrected coordinate points only need to be provided on the extension line L. Since the extension line L is a curve connecting from the control point P0 in the area A through the outside of the area A to the control point P3 in the area A, some of the corrected points p5' to p7' may be positioned inside the area A. In step S40, the contents of the limit acceleration data group 631' stored in the main memory 13 are rewritten into the corrected contents.

Figure 19:
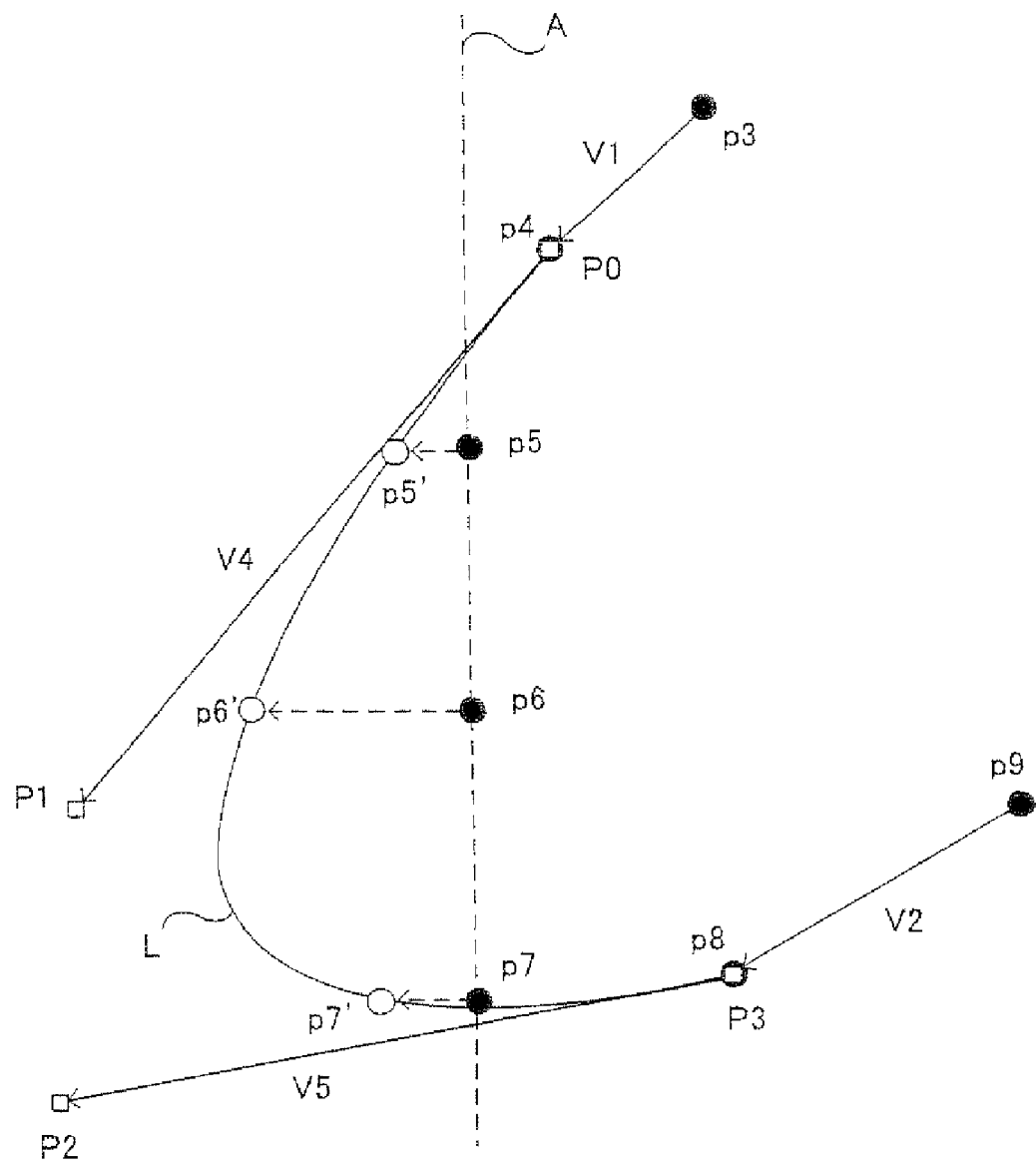
FIG. 19 is a diagram illustrating another exemplary method of correcting limit acceleration data.

Note that, according to the correction method of FIG. 18, the coordinate values of the corrected pieces of limit acceleration data can be arranged on the extension line with good balance. When intervals of actual accelerations can be assumed to be substantially constant during the time when acceleration data takes a limit value, the correction method of FIG. 18 is effective. Note that a method of correcting limit acceleration data in accordance with an extension line is not limited to the above-described correction method, and any method can be used as long as the xy coordinate values of the limit acceleration data may be corrected so as to become coordinate values on the extension line. FIG. 19 is a diagram illustrating another exemplary method of correcting limit acceleration data. In the method of FIG. 19, only x coordinate values of limit acceleration data are corrected, and y coordinate values are not corrected. Thus, in other embodiments, acceleration values may be corrected with respect to only one (x component in FIG. 19) taking a limit value of the components of limit acceleration data. When acceleration values of components other than a component taking a limit value can be assumed to be reliable, the method of FIG. 19 is effective.

In step S41, the CPU 10 determines whether or not all pieces of limit acceleration data have been corrected. When there is remaining limit acceleration data which has not been selected in step S31, it is determined that there is limit acceleration data which has not been corrected, and the process of step S31 is executed again with respect to limit acceleration data not yet corrected. On the other hand, when all pieces of limit acceleration data have been selected in step S31, it is determined that all the pieces of limit acceleration data have been corrected, and the CPU 10 ends the data correcting process of FIG. 17.

In the above-described data correcting process, the extension line L is calculated, and the values of acceleration data are corrected so that xy coordinates indicated by the acceleration data are positioned on the extension line L. In other words, the transition of accelerations during the time when actual values thereof which exceed the limit value range cannot be detected, is estimated using the extension line L. Thereby, it is possible to more accurately know the acceleration transition over the above-described whole movement period, thereby making it possible to correct the values of the selected acceleration data group 631 into more accurate ones.

Also, in the above-described embodiment, the slope (the vector V4 of FIG. 18) at the first control point P0 of the extension line (Bezier curve) L is calculated based on the first direction vector V1 and the third direction vector V3 (see expression (5)). The slope (the vector V5 of FIG. 18) at the fourth control point P3 of the extension line (Bezier curve) L is calculated based on the second direction vector V2 and the third direction vector V3 (see expression (6)). Here, as can be seen from the above-described step S35, the first direction vector V1 indicates the transition of the value of acceleration data immediately before the acceleration data takes the limit value. The second direction vector V2 indicates the transition of the value of acceleration data immediately after the acceleration data takes the limit value. Therefore, by determining the slopes at the end points of the extension line L based on the first and second direction vectors V1 and V2, curves indicating the transition of the values of acceleration data before and after the acceleration data takes the limit value can be connected to the extension line L in a smooth manner (continuous change in the slope). Thereby, the transition of accelerations during the time when actual values which exceed the limit value range cannot be detected can be accurately estimated as an approximation to actual transition.

Also, as illustrated in FIG. 15, the third direction vector V3 indicates the transition of accelerations over the whole movement period. Therefore, by determining the slopes at end-points of the extension line L based on the third direction vector V3, the slopes can be determined, reflecting the tendency of the whole acceleration transition over the movement period. Thereby, the transition of accelerations during the time when actual values which exceed the limit value range cannot be detected can be accurately estimated as an approximation to actual transition. For example, in a method of determining the slope of the extension line L only based on the first and second direction vectors V1 and V2, when the immediately previous acceleration data or the immediately next acceleration data takes an incorrect or irregular value for some reason, it is likely that the extension line L cannot be accurately estimated. By further determining the slope of the extension line L based on the third direction vector V3, the extension line L can be accurately estimated even when some pieces of the acceleration data take incorrect or irregular values.

Further, in the above-described embodiment, the protrusion amount n is calculated, depending on the number of pieces of limit acceleration data (step S37), and the second and third control points are determined based on the protrusion amount n (expressions (5) and (6)). According to expressions (5) and (6), the positions of the second and third control points become more distant from the area A indicating a limit value range with an increase in the value of the protrusion amount n. In other words, the distance from the point B on the extension line L most distant from the area A, to the area A increases with an increase in the value of the protrusion amount n. Here, a large value of the protrusion amount n means a large number of pieces of limit acceleration data, i.e., a long period during which actual values which exceed the limit value range cannot be detected. The value of an actual acceleration during the period is considered to increase, depending on the length of the period. Therefore, by increasing the distance from the point B on the extension line L to the area A, depending on the protrusion amount n, it is possible to calculate an extension line which is more approximate to actual acceleration transition.

Referring back to FIG. 16, in steps S23 and S24 following step S22, a movement direction vector Vm is calculated from the corrected selected acceleration data group 631. A process of calculating the movement direction vector Vm is similar to the process of step S32. Specifically, the CPU 10 calculates a two-dimensional vector in the xy coordinate system based on expression (2). Step S22 is different from step S32 in that expression (2) is calculated using the selected acceleration data group 631 in which the limit acceleration data group 631' has been corrected. By using the corrected selected acceleration data group 631, the movement direction vector Vm can be accurately calculated.

Specifically, initially, in step S23, a difference vector group is calculated from the corrected selected acceleration data group 631. For each piece of acceleration data included in the selected acceleration data group 631, the CPU 10 calculates a difference (difference vector) between an acceleration vector indicated by the acceleration data, and an acceleration vector indicated by acceleration data which was next obtained. Note that "$(VA_{t+1}-VA_t)$" of expression (2) corresponds to this difference vector. Data indicating each difference vector calculated in step S23 is stored as the difference vector data group 640 into the main memory 13. Next, in step S24, the CPU 10 calculates a movement direction vector based on the difference vector data group 640 stored in the main memory 13. Specifically, a sum of the difference vectors is calculated while assigning each difference vector a weight depending on the magnitude of the difference vector. Note that "$(VA_{t+1}-VA_t)$" of expression (2) corresponds to a weight assigned to each difference vector. Also, the movement direction vector Vm calculated by expression (2) is normalized. Specifically, the length is corrected into "1". Data indicating the movement direction vector Vm thus calculated is stored as the movement direction data 641 into the main memory 13.

Next, in step S25, a gravity direction vector Vg is calculated based on the corrected selected acceleration data group 631. Specifically, the CPU 10 calculates the gravity direction vector Vg by:

$$Vg = \sum_{t=1}^{k} VA_t. \tag{7}$$

As indicated by expression (7), the gravity direction vector Vg is calculated as a sum of the acceleration vectors VA included in the selected acceleration data group 631. Also, the gravity direction vector Vg calculated by expression (7) is normalized, i.e., the length is corrected into "1". Data indicating the gravity direction vector Vg thus calculated is stored as the gravity direction data 642 into the main memory 13. When the origin in the xy coordinate system is a reference point, the gravity direction vector Vg thus calculated indicates a deviation from the reference point of each acceleration vector included in the selected acceleration data group 631. In this embodiment, the gravity direction is calculated by calculating the deviation. Note that the deviation may be calculated using other methods instead of the method of calculating the sum of the acceleration vectors VA.

Next, in step S26, the CPU 10 calculates a swing direction vector based on the movement direction data 641 and the gravity direction data 642 stored in the main memory 13. As described above, the swing direction vector is a vector indicating a direction in which the controller 7 is moved with respect to the gravity direction. Specifically, the CPU 10 performs a rotation process with respect to both the movement direction vector Vm and the gravity direction vector Vg so that the gravity direction vector Vg is oriented in a predetermined reference direction. The rotated movement direction vector Vm is referred to as a swing direction vector Vs. Note that, while the swing direction vector Vs is represented in the XY coordinate system for representing a direction using the gravity direction as a reference, the movement direction vector Vm and the gravity direction vector Vg are represented in the xy coordinate system using an orientation of the controller 7 as a reference. Therefore, the rotation process is performed as coordinate transformation from the xy coordinate system to the XY coordinate system. Specifically, the CPU 10 calculates the swing direction vector Vs= (SX, SY) by:

$$SX=-gy\times mx+gx\times my$$

$$SY=-gx\times mx-gy-my \tag{8}$$

where the movement direction vector Vm is (mx, my) and the gravity direction vector Vg is (gx, gy). Note that, in this embodiment, the XY coordinate system is an orthogonal coordinate system in which a gravity direction when the upper surface of the controller 7 faces vertically upward is the negative direction of the Y axis. Therefore, the reference direction in the XY coordinate system is the negative direction of the Y axis.

Figure 20:
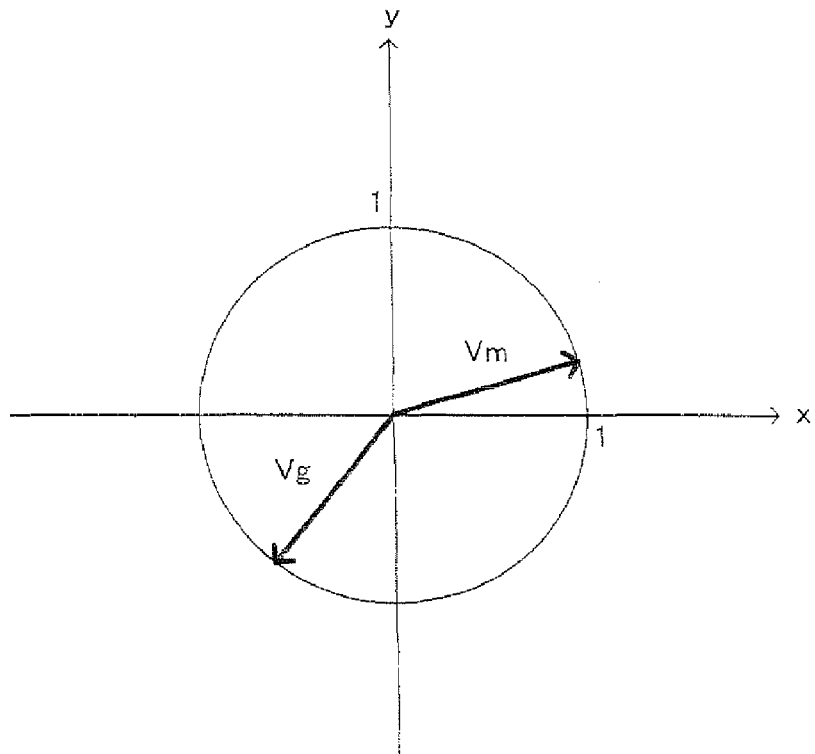
FIG. 20 is a diagram illustrating a movement direction vector Vm and a gravity direction vector Vg in an xy coordinate system.
Figure 21:
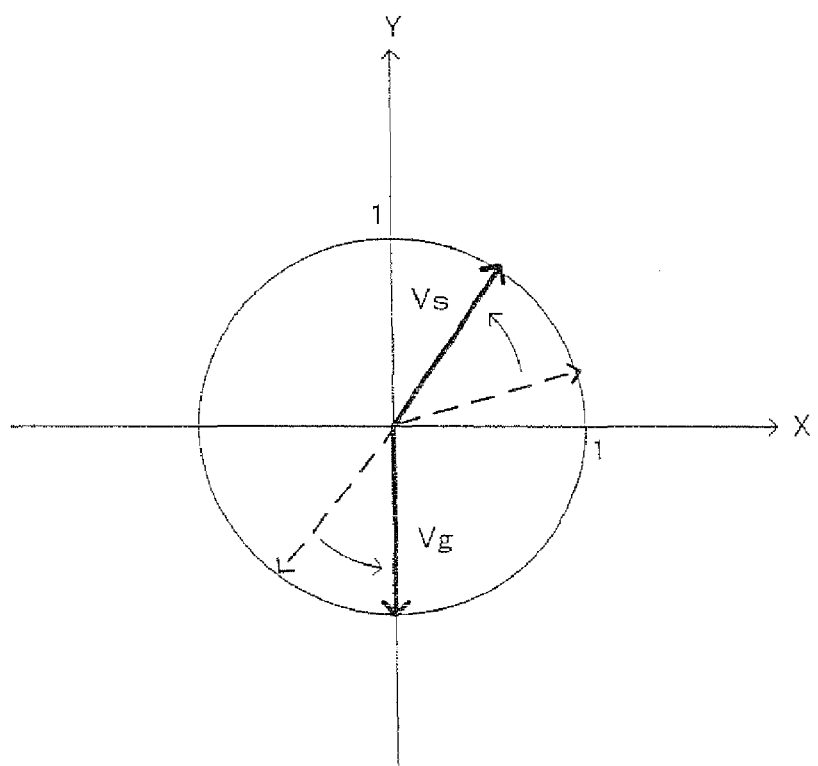
FIG. 21 is a diagram illustrating a swing direction vector Vs in an XY coordinate system.

FIG. 20 is a diagram illustrating the movement direction vector Vm and the gravity direction vector Vg in the xy coordinate system. FIG. 21 is a diagram illustrating a swing direction vector in the XY coordinate system. For example, after the movement direction vector Vm and the gravity direction vector Vg of FIG. 20 are calculated, the CPU 10 performs coordinate transformation to rotate both the movement direction vector Vm and the gravity direction vector Vg so that the gravity direction vector Vg is oriented in the negative direction of the Y axis. As illustrated in FIG. 21, the movement direction vector Vm after being rotated (coordinate transformation) is the swing direction vector Vs.

Data indicating the swing direction vector Vs thus obtained is stored as the swing direction data 643 into the main memory 13. After step S26, the CPU 10 ends the swing direction calculating process. Although the swing direction is represented as a vector in this embodiment, the swing direction may be represented as an angle in other embodiments. For example, the swing direction may be represented as the magnitude of an angle between the movement direction vector Vm and the gravity direction vector Vg.

Referring back to FIG. 15, following step S8, the process of step S9 is executed. Specifically, in step S9, the CPU 10 executes a game process, depending on the swing direction calculated in step S8. Specifically, an animation in which the sword object 52 is moved in a direction corresponding to the swing direction is displayed on the monitor 2 (see FIG. 11). The CPU 10 determines whether or not the sword object 52 contacts the log object 51 as a result of the movement of the sword object 52 in the game space. When the sword object 52 contacts the log object 51, a state of the log object 51 cut along a track of the sword object 52 is displayed (see FIG. 11). Also, when the log object 51 is cut, after the cut log object 51 is displayed for a predetermined time, a new log object 51 may be displayed, though not indicated in the flowchart of FIG. 15. The log object 51 may be moved in the game space.

Next, in step S10, the operation flag is set to be OFF. Specifically, the CPU 10 rewrites the contents of the operation flag data 644 stored in the main memory 13 into data indicating OFF. Thereby, when the loop process of steps S2 to S11 is next performed, the determination result of step S3 becomes negative. Note that, in step S9, the contents of the data 631 to 643 stored in the main memory 13 are cleared.

Next, in step S11, the CPU 10 determines whether or not the game is ended. The determination of step S11 is performed, depending on, for example, whether or not the player has issued an instruction to end the game, whether or not the player has cleared the game, or when a limit time is provided to the game, whether or not the limit time has passed. When the determination result of step S11 is negative, the process of step S2 is executed again, and thereafter, the process loop of steps S2 to S11 is executed until it is determined that the game is ended. On the other hand, when the determination result of step S11 is positive, the CPU 10 ends the process of FIG. 14. The process of the game apparatus 3 has been heretofore described.

As described above, according to this embodiment, acceleration data is obtained from the controller 7 (step S12), and from the obtained acceleration data, two kinds of vectors (i.e., the movement direction vector Vm and the gravity direction vector Vg) are calculated (steps S23 to S25). Thus, in this embodiment, it is possible to obtain two kinds of information indicating a state of the controller 7 from one kind of information detected by a sensor. The game apparatus 3 performs a game process, reflecting the two kinds of information on a game operation (step S9). Thereby, the player is allowed to perform a complicated game operation based on the two kinds of states of the controller 7 using a simple configuration in which only one sensor is employed.

Also, according to this embodiment, when the value of acceleration data is a limit value, an extension line is used to correct values of a limit acceleration data group (step S22). Specifically, the game apparatus 3, when the acceleration sensor 37 cannot detect an actual acceleration value, uses the extension line to estimate the actual acceleration value. Thereby, even when an actual acceleration value exceeds a limit value, the actual acceleration value can be accurately calculated. Therefore, when the calculated acceleration value is used to calculate a state (e.g., a swing direction) of the controller 7, the state of the controller 7 can be more accurately calculated.

Also, in the above-described embodiment, the game apparatus 3 calculates a gravity direction by calculating a sum of acceleration vectors detected during a movement period (step S25). Here, since the acceleration vector detected during the movement period includes a component caused by movement of the controller 7 in addition to a component caused by gravity applied to the controller 7, the gravity direction cannot be accurately recognized directly from the detected acceleration during the movement period. In contrast to this, in this embodiment, since the sum of acceleration vectors detected during the movement period is calculated, the components of the acceleration vectors caused by movement of the controller 7 cancel each other, only the component caused by gravity, which is invariably detected, can be extracted. Particularly in the case of games, it is important to recognize a player's operation, and therefore, attention is paid to the fact that the operation has a start and an end. Therefore, by the process of step S25, the gravity direction applied to the controller 7 can be recognized in a player's operation accompanied by movement of the controller 7.

Also, in the above-described embodiment, the game apparatus 3 calculates a movement direction vector based on difference vectors indicating the transition of values of the selected acceleration data group 631. Specifically, the game apparatus 3 calculates difference vectors with respect to the selected acceleration data group 631, and calculates a sum of the difference vectors while assigning respective predetermined weights thereto, thereby calculating a movement direction vector (steps S23 and S24). The predetermined weight is set to be a value depending on the magnitude of the difference vector (expression (2)). A portion having a large difference vector indicates a quick swing operation, which is a characteristic swing operation. Therefore, by highly evaluating, as a characteristic portion, a difference vector having a large magnitude of the difference vectors calculated from the selected acceleration data group 631, the movement direction of the controller 7 can be calculated.

Note that, as a method of calculating a movement direction, a sum of difference vectors may be simply calculated without a weight. In this method, the sum of the difference vectors is a vector whose initial point has the xy coordinate values of an acceleration vector at the start time of the movement period and whose final point has the xy coordinate values of an acceleration vector at the end time. In the example of FIG. 15, the sum of the difference vectors is a vector which has the point p0 as the initial point and the point p19 as the final point. By the above-described method, the movement direction of the controller 7 can be calculated, depending on the method of detecting the start time and the end time of the movement period.

Note that, in the above-described method, the movement direction may not be accurately recognized. For example, when an acceleration vector at the start time of the movement period and an acceleration vector at the end time have substantially the same value, the movement direction may not be accurately recognized. This is because, if the acceleration vector at the start time and the acceleration vector at the end time have the same value, the sum of the difference vectors is "0". In the example of FIG. 15, the acceleration vector at start time (point p1) and the acceleration vector at the end time (point p19) are largely separated from each other. However, the acceleration vector at the start time and the acceleration vector at the end time may have substantially the same value, depending on the method of setting the first and second thresholds. If the two acceleration vectors have substantially the same value, the direction of a vector indicating the sum of the difference vectors is not necessarily a direction corresponding to the movement direction.

Therefore, in this embodiment, a sum of difference vectors is calculated while assigning a predetermined weight to each difference vector. Thereby, even if the above-described two vectors have the same value, the vector indicating the sum is not "0", and of the difference vectors, a component of a difference vector having a large magnitude which is a characteristic portion is reflected on the sum. In other words, the vector indicating the sum indicates the movement direction of the controller 7. Thus, in the above-described step S25, although a sum of difference vectors may be simply calculated without a weight, weighted summation is preferable.

(Variation of Extension Line)

Note that, in the above-described embodiment, a Bezier curve is used as an extension line for correcting acceleration data. Here, in other embodiments, the extension line is not limited to Bezier curves, and may be any one which can estimate an actual acceleration value when acceleration data has a limit value. In other words, the extension line may be a line passing through the outside a detectable range of the acceleration sensor 37. Note that not the whole extension line needs to pass through the outside of the detectable range, and at least a portion of the extension line may pass the outside of the detectable range.

For example, as the extension line, a cardinal spline curve or a B-spline curve may be used instead of a Bezier curve. These curves are represented by a function including one or more control points. When a curve represented by such a function is used, a complicated curve shape can be determined by determining the control points. Therefore, an acceleration can be accurately estimated using a complicated curve, and the curve can be easily calculated.

Figure 22:
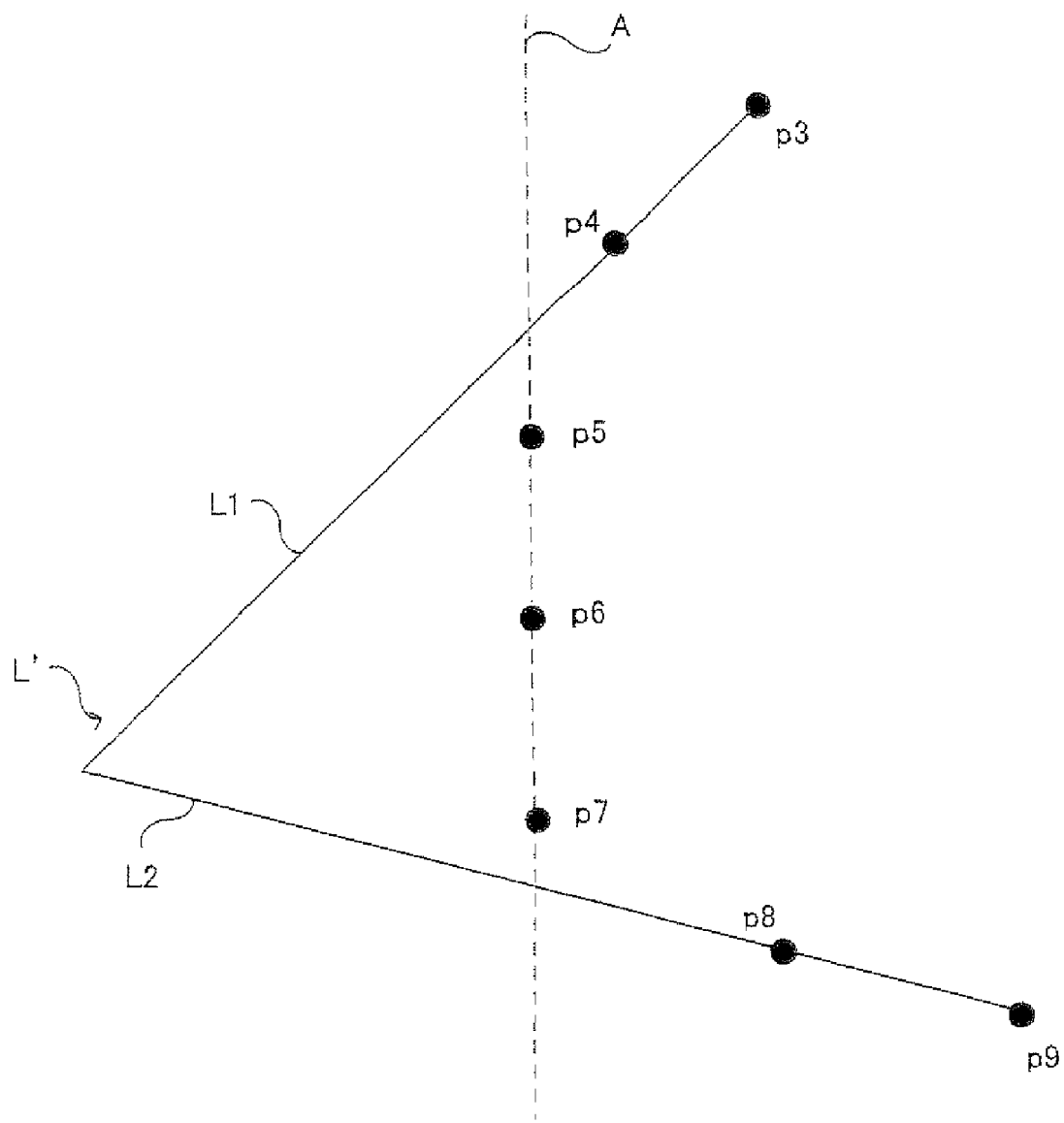
FIG. 22 is a diagram illustrating another exemplary extension line.

Also, the extension line is not limited to curves, and may be a broken line composed of a plurality of line segments. FIG. 22 is a diagram illustrating another exemplary extension line. In FIG. 22, an extension line L' is composed of a line segment L1 and a line segment L2. The line segment L1 is obtained by extending a line segment connecting the point p4 of the immediately previous acceleration data and the point p3 of the first preceding acceleration data obtained with respect to the immediately previous acceleration data, outward from the point p4. The line segment L2 is obtained by extending a line segment connecting the point p8 of the immediately next acceleration data and the point p9 of the first succeeding acceleration data obtained with respect to the immediately next acceleration data, outward from the point p8. When the extension line L' is used, a process of calculating the extension line can be made easier as compared to when a curve determined by control points is used as described above. Note that the slope of the line segment L1 may be determined by the first direction vector V1, and the slope of the line segment L2 may be determined by the second direction vector V2.

(Variation of Order of Acceleration Data)

The above-described embodiment has been described in detail where two-dimensional acceleration vectors are used as an example. In other embodiments, accelerations indicated by acceleration data may be three-dimensional acceleration values or one-dimensional acceleration values. When three-dimensional acceleration vectors are employed, an extension line can be calculated in a three-dimensional xyz coordinate system in a manner similar to that of the two-dimensional xy coordinate system.

Figure 23:
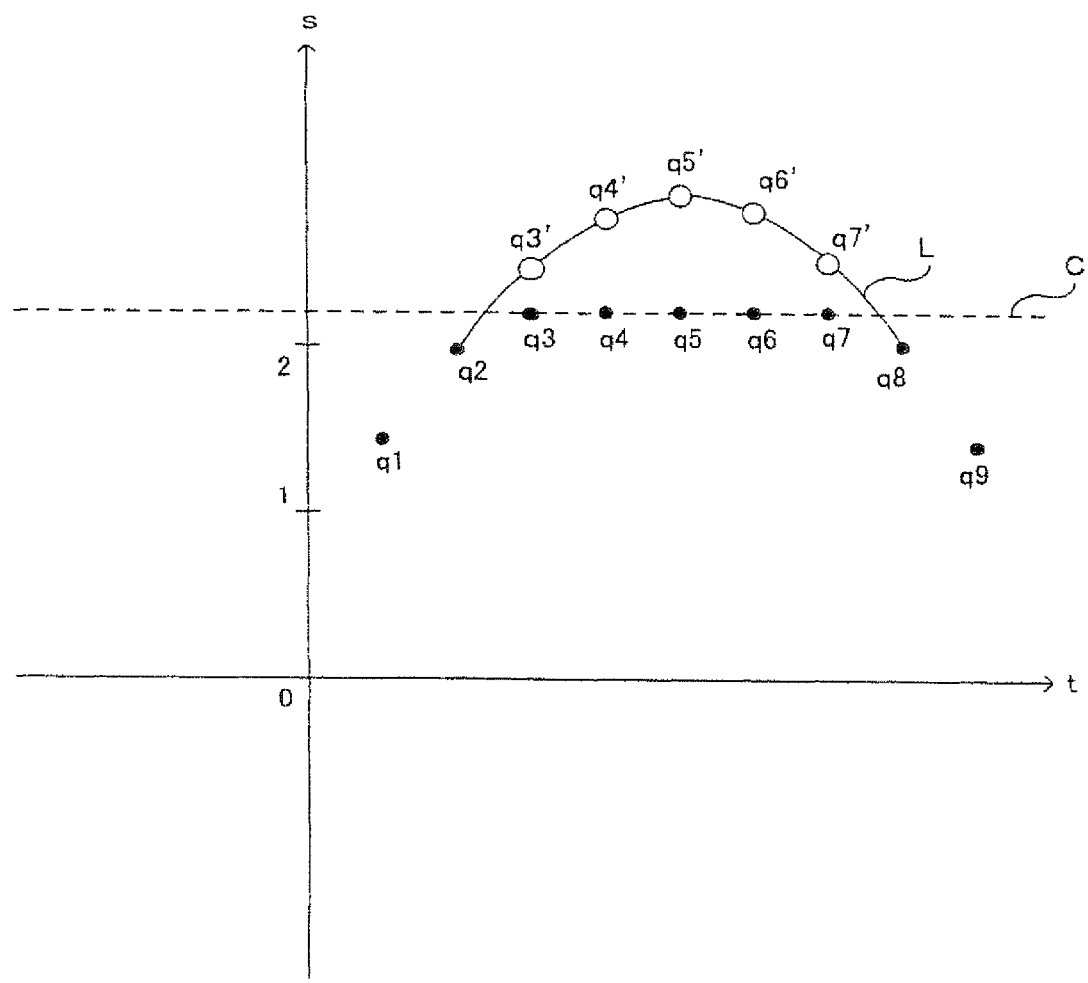
FIG. 23 is a diagram illustrating a coordinate system when one-dimensional acceleration values are employed.

Also, when one-dimensional acceleration values are employed, by using a two-dimensional coordinate system whose axes are an acceleration value indicated by acceleration data and a time, an extension line can be calculated in a manner similar to the case of the two-dimensional xy coordinate system. FIG. 23 is a diagram illustrating a coordinate system when one-dimensional acceleration values are employed. In a coordinate system of FIG. 23, the horizontal axis represents a time (t), and the vertical axis represents an acceleration value (s). Points q1 to q9 indicate accelerations detected with an acceleration sensor. A dashed line C of FIG. 23 indicates a limit value of a detectable range of the acceleration sensor.

In FIG. 23, the points q3 to q7 indicate the limit value. In this case, the game apparatus 3 calculates an extension line L using a method similar to that of the above-described embodiment, and corrects acceleration values of the points q3 to q7 so as to become values on the extension line L. Note that, if the variable x of the above-described embodiment is replaced with a variable t and the variable y is replaced with a variable s, the extension line L can be calculated in a manner similar to that of the above-described embodiment. Note that points q3' to q7' of FIG. 23 indicate the corrected acceleration values. By using the acceleration data group thus corrected to calculate a state of the controller 7, accurate calculation can be performed as compared to when an acceleration data group before correction is used to calculate the state of the controller 7. Even regarding accelerations with respect to one axis, the transition of the accelerations can be more accurately calculated.

As described above, the present invention can be utilized as a game apparatus or a game program for the purpose of, for example, providing a complicated operation using a simple configuration.

While the invention has been described in detail, the foregoing description is in all aspects illustrative and not restrictive. It is understood that numerous other modifications and variations can be devised without departing from the scope of the invention.

What is claimed is:

1. A movement direction calculating apparatus for calculating a movement direction of an input device, the apparatus comprising:

an obtaining means for successively obtaining acceleration data output from a multi-axis acceleration sensor included in the input device;

a period detecting means for detecting a movement period corresponding to a movement of the input device, wherein the movement period is detected based on the obtained acceleration data;

a difference vector calculating means for calculating a plurality of difference vectors each representing an acceleration change occurring during a time interval in the movement period, wherein each difference vector represents a difference between a first acceleration vector corresponding to first acceleration data and a second acceleration vector corresponding to second acceleration data obtained sequentially in time next to the first acceleration data, wherein the first acceleration data and second acceleration data are obtained during the movement period, and the first acceleration vector and the second acceleration vector each include acceleration values corresponding to a plurality of axes of acceleration; and a movement direction calculating means for calculating a movement direction vector for the movement period, wherein the movement direction vector is calculated based on a sum of the difference vectors, wherein each difference vector when summed is weighted based on the magnitude of the difference vector.

2. The movement direction calculating apparatus according to claim 1, wherein the period detecting means includes:
a start setting means for setting a point in time when an acceleration value with respect to one predetermined axis of the axes of acceleration exceeds a first threshold as a start of the movement period; and
an end setting means for setting a point in time when an acceleration value with respect to the one predetermined one axis becomes smaller than a second threshold as an of the movement period.

3. The movement direction calculating apparatus according to claim 2, wherein the multi-axis acceleration sensor is a three-axis acceleration sensor, and
the difference vector calculating means calculates each of the difference vectors as a vector whose components are acceleration values with respect to two axes of acceleration sensed by the acceleration sensor, wherein the two axes are other than the one predetermined axis.

4. A computer readable non-transitory storage medium storing a movement direction calculating program which when executed by a computer in a movement direction calculating apparatus causes the apparatus to perform:
an obtaining step of successively obtaining acceleration data output from a multi-axis acceleration sensor included in the input device, wherein the acceleration data indicates acceleration of the input device along acceleration axes;
a period detecting step of detecting a movement period corresponding to a movement of the input device, wherein the period detection is based on the obtained acceleration data;
a difference vector calculating step of calculating difference vectors each representing an acceleration change occurring between a first acceleration vector representing first acceleration data and a second acceleration vector representing second acceleration data obtained sequentially in time next to the first acceleration data, wherein the first and second acceleration data are obtained during the movement period, and the first and second acceleration vectors each have components corresponding to at least two of the acceleration axes, and
a movement direction calculating step of calculating a movement direction vector based on a sum of the difference vectors, wherein the each of the difference vectors when summed is weighted depending on the magnitude of the difference vector.

5. The non-transitory storage medium according to claim 4, wherein the period detecting step includes:
a start setting step of setting as a start of the movement period a point in time when an acceleration value exceeds a first threshold with respect to one predetermined axis of the acceleration axes; and
an end setting step of setting as an end to the movement period a point in time when the acceleration value with respect to the one predetermined axis falls below a second threshold.

6. The non-transitory storage medium according to claim 5, wherein the multi-axis acceleration sensor is a three-axis acceleration sensor, and in the difference vector calculating step the acceleration vector includes acceleration values corresponding to two of the acceleration axes other than the one predetermined axis.

7. A movement direction calculating apparatus comprising:
an input device including a multi-axis acceleration sensor;
a computer executing instructions stored on a non-transitory storage device, wherein the instructions cause the movement direction calculating apparatus to:
obtain acceleration data output from the multi-axis acceleration sensor during each of successive intervals;
determine a movement period as a period during a movement of the input device wherein the determination is based on the obtained acceleration data;
calculate difference vectors each representing a difference between a pair of acceleration vectors corresponding to acceleration data obtained during a pair of successive intervals during the movement period;
summing the difference vectors to calculate a direction vector, wherein each of the difference vectors when summed has a weight indicative of a magnitude of the difference vector, and
designating as the movement direction a direction indicated by the direction vector.

8. The movement direction calculating apparatus according to claim 7 wherein the determination of the movement period includes setting a start of the movement period based on an acceleration value exceeding a first threshold, wherein the acceleration value exceeding a first threshold is with respect to one predetermined axis of acceleration values.

9. The movement direction calculating apparatus according to claim 8 wherein the determination of the movement period includes setting an end of the movement period as occurring when an acceleration value becomes smaller that a second threshold, wherein the acceleration value exceeding a second threshold is with respect to one predetermined axis.

10. The movement direction calculating apparatus according to claim 8 wherein the multi-axis acceleration sensor is a three-axis acceleration sensor, and the acceleration vectors used to calculated the difference vectors include acceleration values with respect to no more than two axes which are other than the one predetermined axis.

11. A non-transitory storage medium storing a computer program which when executed by a computer causes a movement direction calculating apparatus to:
successively obtain acceleration data from a multi-axis acceleration sensor in an input device for the movement direction calculating apparatus;
detecting a period of a movement of the input device based on the obtained acceleration data;
calculating successive difference vectors each indicating a difference between a successive pair of acceleration vectors, wherein the pair of acceleration vectors are representative of the acceleration data obtained at successive intervals during the period of movement, and each of the acceleration vectors in the pair is defined by acceleration values corresponding to a plurality of axes indicated by the acceleration data;
calculating a sum of the successive difference vectors wherein each difference vector when summed is weighted based on a magnitude of the difference vector, and
designating the movement direction as a direction of a vector indicated by the sum is the difference vectors.

12. The non-transitory storage medium according to claim 11, wherein the detection of the period of movement includes setting a start time when an acceleration value in the acceleration data exceeds a first threshold with respect to one predetermined axis of acceleration values.

13. The non-transitory storage medium according to claim 12 wherein the detection of the period of movement includes setting an end time to the period as when an acceleration value in the acceleration data falls below a second threshold with respect to one predetermined axis of acceleration values.

14. The storage medium according to claim 12, wherein the multi-axis acceleration sensor is a three-axis acceleration sensor, and the acceleration vectors are each a vector whose components are acceleration values with respect to two axes other than the one predetermined axis.

15. A method of using a computer processor to calculate a movement direction of a handheld device including a multi-axis acceleration sensor, the method comprising:
   acquiring multi-axis acceleration values sensed by the multi-axis acceleration sensor, wherein acceleration values are acquired during successive time intervals;
   detecting a movement period based on the acquired multi-axis acceleration values;
   automatically calculating successive acceleration vectors each having a magnitude and direction corresponding to one of the multi-axis acceleration values acquired within the movement period;
   automatically calculating differences between successive acceleration vectors; to yield acceleration difference vectors
   automatically assigning a weight to each of the acceleration difference vectors based on the magnitude of the acceleration difference vector, and
   automatically summing the weighted acceleration difference vectors to determine the movement direction.

16. The method of claim 15 wherein the detection of the movement period includes setting a start of the movement period by identifying one of the acceleration values having an acceleration magnitude in one predetermined axis exceeding a first threshold.

17. The method of claim 16 wherein the detection of the movement period includes setting an end of the movement period by identifying another one of the acceleration values having an acceleration magnitude in the one predetermined axis below a second threshold.

18. The method of claim 15 wherein the direction of each of the successive acceleration vectors is perpendicular to the one predetermined axis.

* * * * *